United States Patent
Zhang et al.

(10) Patent No.: US 12,203,000 B2
(45) Date of Patent: Jan. 21, 2025

(54) ADHESION PROMOTERS AND THEIR USE

(71) Applicant: Henkel AG & Co. KGaA, Duesseldorf (DE)

(72) Inventors: Bong June Zhang, Chestnut Hill, MA (US); Esra Altinok, Medford, MA (US); Perry L. Catchings, Sr., Roxbury, MA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 207 days.

(21) Appl. No.: 16/641,110

(22) PCT Filed: Aug. 24, 2018

(86) PCT No.: PCT/US2018/048030
§ 371 (c)(1),
(2) Date: Feb. 21, 2020

(87) PCT Pub. No.: WO2019/040922
PCT Pub. Date: Feb. 28, 2019

(65) Prior Publication Data
US 2020/0208012 A1    Jul. 2, 2020

Related U.S. Application Data

(60) Provisional application No. 62/765,287, filed on Aug. 19, 2018, provisional application No. 62/549,764, filed on Aug. 24, 2017.

(51) Int. Cl.
*C09D 183/04*    (2006.01)
*B05D 7/00*    (2006.01)
(Continued)

(52) U.S. Cl.
CPC ............ *C09D 183/04* (2013.01); *B05D 7/54* (2013.01); *B32B 7/12* (2013.01); *B32B 27/26* (2013.01);
(Continued)

(58) Field of Classification Search
CPC .. C09D 183/04; C09D 183/08; C09D 183/16; C09D 183/14; B05D 7/54; B32B 7/12;
(Continued)

(56) References Cited

U.S. PATENT DOCUMENTS 5,008,349 A    4/1991    Kosal et al.
6,323,277 B1 *    11/2001    Petty .................... C08K 5/5425
                                                                528/33
(Continued)

FOREIGN PATENT DOCUMENTS

CN    102471669 A    5/2012
EP    2 225 313 B1    4/2016
(Continued)

OTHER PUBLICATIONS

International Search Report (PCT/US18/48030, filed Aug. 24, 2018).

*Primary Examiner* — Michael B Nelson
(74) *Attorney, Agent, or Firm* — Fox Rothschild LLP

(57) ABSTRACT

The present disclosure relates, in exemplary embodiments, to coating compositions comprising adhesion promoters and articles comprising the same.

9 Claims, 2 Drawing Sheets

(51) Int. Cl.
    *B32B 7/12*         (2006.01)
    *B32B 27/26*       (2006.01)
    *B32B 27/28*       (2006.01)
    *C08G 77/24*       (2006.01)
    *C08G 77/62*       (2006.01)
    *C09D 183/08*     (2006.01)
    *C09D 183/16*     (2006.01)

(52) U.S. Cl.
    CPC ............ *B32B 27/283* (2013.01); *C08G 77/24* (2013.01); *C08G 77/62* (2013.01); *C09D 183/08* (2013.01); *C09D 183/16* (2013.01)

(58) Field of Classification Search
    CPC . B32B 27/26; B32B 27/283; B32B 17/10036; B32B 17/10165; B32B 17/10761; B32B 2255/02; B32B 2255/20; B32B 2255/26; B32B 2307/412; B32B 27/281; B32B 27/32; B32B 2250/03; B32B 2255/102; B32B 2307/558; B32B 2307/73; B32B 2605/006; B32B 27/08; B32B 27/12; B32B 27/30; B32B 27/302; B32B 27/306; B32B 27/308; B32B 27/325; B32B 27/34; B32B 27/36; B32B 27/365; B32B 27/40; B32B 2255/28; B32B 2262/101; B32B 2307/3065; B32B 2307/418; B32B 2307/546; B32B 2307/7265; B32B 2307/746; B32B 9/04; B32B 23/08; B32B 27/304; C08G 77/24; C08G 77/62; C08G 77/50; C07F 7/21; C08L 101/00
    See application file for complete search history.

(56) References Cited

U.S. PATENT DOCUMENTS

| | | | |
|---|---|---|---|
| 7,344,783 | B2 * | 3/2008 | Shea ........................ C03C 17/30 428/428 |
| 2004/0249061 | A1 | 12/2004 | Sunkara et al. |
| 2011/0000658 | A1 | 1/2011 | Tanaka et al. |
| 2012/0135252 | A1 * | 5/2012 | Kishikawa ........... C09D 183/16 428/448 |
| 2018/0003861 | A1 * | 1/2018 | Valeri ..................... B32B 27/00 |
| 2020/0317949 | A1 * | 10/2020 | Weiher ................... C08G 18/10 |

FOREIGN PATENT DOCUMENTS

| | | |
|---|---|---|
| JP | 2012-041586 A | 3/2012 |
| WO | WO-2005/007764 | 1/2005 |

\* cited by examiner

ADHESION PROMOTERS AND THEIR USE

This application is a 35 U.S.C. § 371 U.S. national entry of International Application PCT/US2018/048030, having an International filing date of Aug. 24, 2018. This application claims the benefit of priority under 35 U.S.C. 119 of 1) U.S. provisional application No. 62/549,764, filed Aug. 24, 2017, and 2) U.S. provisional application No. 62/765,287 filed Aug. 19, 2018, all of which applications are incorporated herein by reference in their entirety.

FIELD

The present disclosure relates, in exemplary embodiments, to coating compositions comprising adhesion promoters and articles comprising the same.

BACKGROUND

Substrates having treated surface layers are used in various fields. For example, in the transportation industry, such as automobiles, ships, aircrafts, and the like, surfaces of an exterior parts, such as outer panels, window glass, rear view camera lens, or mirror glass, or interior parts, such as a display surface material, an instrument panel, or other articles, are desired to be easily cleaned and to maintain their surface integrity. In the electronics industry, treated surfaces are used in mobile phones, electronic device displays, and the like. And in the building construction and home design industries, treated surfaces are used on windows, doors, decorative panels, furniture, and appliances, such as refrigerators, ovens, ranges, and the like. In the retail segment, treated surfaces are found in athletic wear, shoes and the like.

In all of the exemplary industries described above, the need for treated surfaces has led to the development of certain technologies to aid in protecting the surface of an article or component. For example, for glass surfaces, various organosilyl compounds have been developed for as adhesion promoters. Examples of commercially available organosilyl adhesion promoters include, but are not limited to vinyl trialkoxysilanes, such as vinyl trimethoxysilanes, a.k.a. Z-6300, amino functionalized trimalkoxysilanes, such as (3-aminopropyl)trimethoxysilane, a.k.a. Z-6011, acryloxy trialkoxysilanes, such as (3-acryloxypropyl)trimethoxysilane and 3-(trimethoxysilyl)propyl methacrylate, a.k.a. OFS-6030, epoxy functionalized trialkoxysilanes, such as (3-glycidyloxypropyl)trimethoxysilane, a k a OFS-6040, alkyl trialkoxysilanes, such as octyl trimethoxysilane, a.k.a. OFS-6341, and the like. Such organosilyl compounds can be used in, for example, rubber compounds and plastics to provide coupling between inorganic surfaces, such as clay, glass, and the like, and organic rubber or plastic, to improve adhesion of coatings, such as urethanes, epoxies, phenolics, and the like, to glass and metal surfaces, as pigment treatments, as adhesion promoters in radiation-cured, waterborne and solvent-borne coatings, and numerous other applications. One example of the use of organosilane technology to create high-performance primers is the use of zinc-rich primers for the galvanic protection of ferrous substrates. Hydrolyzates of tetra-ethoxy silane (TEOS) are combined with zinc metal powder. Transesterfication of the alkyl orthosilicate has been found to improve solution stability.

Alternatively, some surface treatment applications have applied isocyanate-based adhesives for bonding glass, wood, composites, rubber, leather, and the like. Isocyanate compounds are generally categorized into aromatic and aliphatic isocyanates. In general, aromatic isocyanates have strong reactivity compared to aliphatic isocyanates, typically by a factor of between about 2-10. Examples of commercially available isocyanate chemicals are methylene diphenyl diisocyanate (MDI), toluene diisocyanate (TDI), hexamethylene diisocyanate (HDI), isophorone diisocyante (IPDI), and the like. These compounds find use as coatings, adhesives, sealants, and elastomers found in items such as paints, glues, and weather resistant materials.

It would be desirable to have a coating that can provide enhanced adhesion between the substrate and the top coating. It would be particularly desirable to have a coating with with optically transparent, chemically resistant, mechanically durable characteristics.

SUMMARY

We now provide new organosilane compositions that can be useful as adhesion promoters (e.g. as applied coating layers) for substrates, such as plastic, polymer material, glass material, ceramic, glass-ceramic, and the like.

The present disclosure also relates to organic and inorganic hybrid adhesion promoters for substrates, such as, glass material, ceramic, glass-ceramic, and the like. Preferred compositions can provide enhanced adhesion between the substrate and a top coating layer with substantial optically transparency, chemically resistance, mechanically durability, and self-healing characteristics.

We also provide coated substrates that suitably comprise: a) a substrate; b) an organosilane coating composition as disclosed herein on the substrate; and c) a topcoat (overcoat) composition associated with the coating composition. One or more components of such a topcoat composition suitably may covalently linked to one or more components of an underlying organosilane coating composition, or minimal or no covalent attachment may exist between layers. In typical embodiments, a topcoat composition will be applied directly over a coating layer of an organosilane composition, although one or more layers of other materials also may be suitably interposed as desired between an organosilane coating composition layer and an overcoated topcoat composition layer.

In a first aspect, preferred organosilane polymers for use in the present compositions are suitably obtainable or obtained from one or more alkoxy-silane reagents; and comprise a linear or branched chain structure. In this aspect, the organosilane polymers suitably may not include a cyclic component such as a polyhedral Si—O group.

In some embodiments, the one or more organosilane polymers have a weight average molecular weight of about 1000 or greater. In additional embodiments, the one or more organosilane polymers suitably have a weight average molecular weight of about 2000 or greater, or a weight average molecular weight of about 4000 or greater. In preferred aspects, the one or more organosilane polymers have a polydispersity of about 8 or less, including from about 2 to 8 or 9, or 2 or 3 to 5, 6, 7, 8 or 9.

In some embodiments, the one or more organosilane polymers may suitably be obtainable from a TEOS-type reagent. Preferably, the one or more organosilane polymers may be obtainable from one or more bis(alkoxysilyl) and/or tris(alkoxysilyl) reagents.

In some preferred embodiments the one or more organosilane polymers may include units having the following Formula (I):

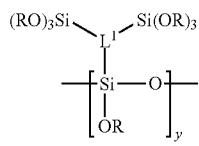

(I)

wherein in Formula (I): each R is the same or different and may be a hydrogen or non-hydrogen substituent; $L^1$ is a linker group; and y is a positive integer.

In additional preferred embodiments, the one or more organosilane polymers may include units having the following Formula (II):

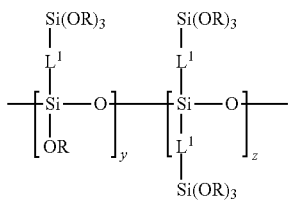

(II)

wherein in Formula (II): each R is the same or different and may be a hydrogen or non-hydrogen substituent; each $L^1$ is the same or different linker group; and y and z are the same or different and each is a positive integer.

In a second aspect, the one or more organosilane polymers may comprise a cyclic structure or moiety, particularly one or more polyhedral structures. In a particular embodiment of this second aspect, an organosilane polymer may include units having the following Formula (III), (IV) and/or (V):

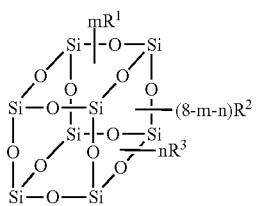

(III)

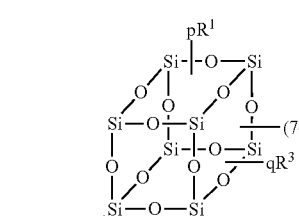

(IV)

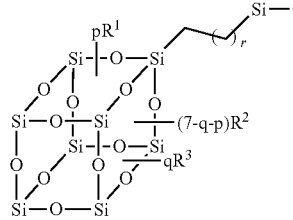

or

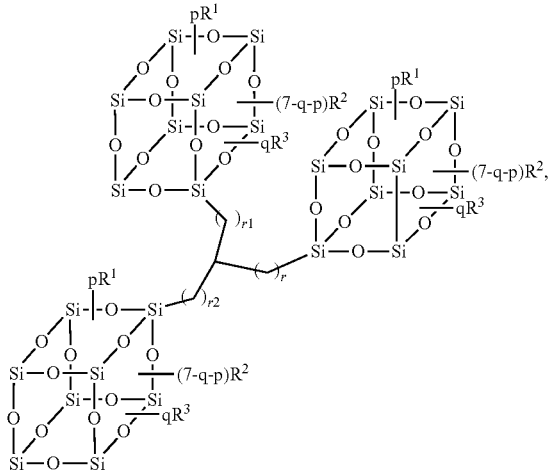

(V)

wherein in those Formulae (II), (IV) and (V), $R^1$, $R^2$, $R^3$, m, n, p, q, r, r1 and r2 are as defined herein.

Articles are also provide that comprise at least one treated or coated surface, wherein the treated or coated surface comprises an adhesion layer comprising at least one adhesion promoter, and optionally one or more additional adhesion promoters, and a top coat covalently attached thereto.

In another aspect, processes are provided for preparing a coated substrate comprising a. coating a surface of a substrate with an adhesion promoter comprising at least one adhesion promoter, and optionally one or more additional adhesion promoters to provide an adhesive layer; and b. contacting the adhesive layer on the substrate with a top coat.

In a particular aspect, a process is provided for preparing a coated substrate comprising obtaining hydrolysable group-tethered adhesion promoter coating on a substrate, comprising: a) activating a surface of a substrate by contacting the surface with a plasma of a gas selected from the group consisting of Ar, He, N2, 02, or H2O or a plasma of a mixture thereof; b) coating a surface of a substrate with an adhesion promoter comprising at least one adhesion promoter, and optionally one or more additional adhesion promoters to provide an adhesive layer; and c) contacting the adhesive layer on the substrate with a top coat.

Other aspects of the invention are disclosed infra.

BRIEF DESCRIPTION OF THE DRAWINGS

The drawings disclose exemplary embodiments or test results in which.

DETAILED DESCRIPTION

Figure 1:
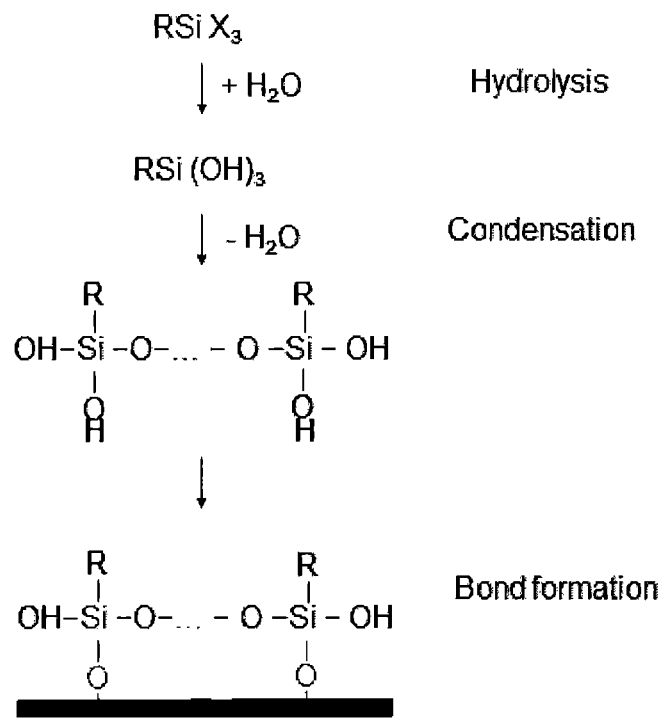
FIG. 1 is a schematic showing a mechanism of hydrolysis, condensation, and bonding of organosilanes to an inorganic surface. R and X are functional group and hydrolysable group.
Figure 2:
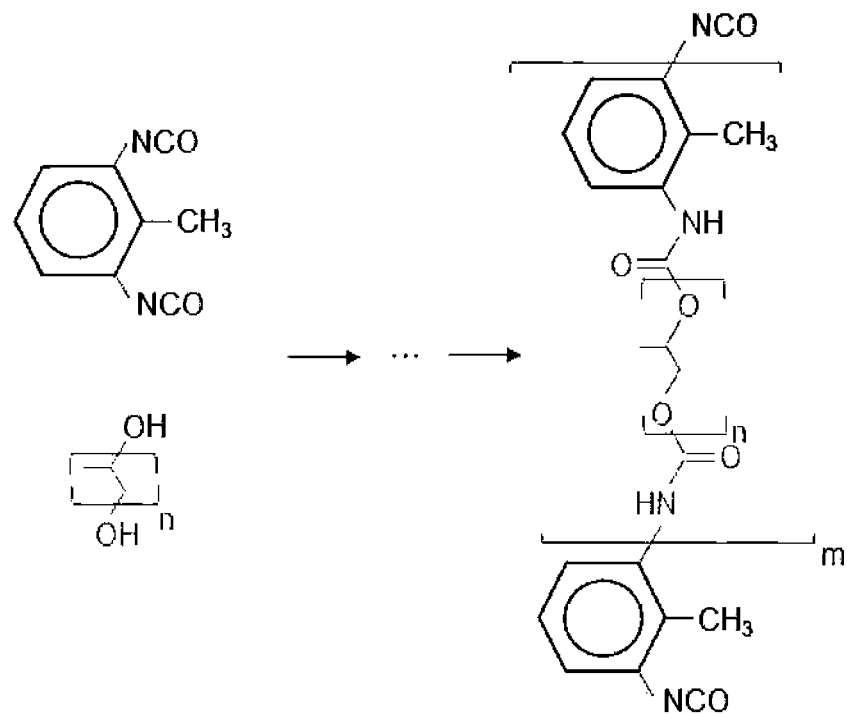
FIG. 2 is a schematic showing a mechanism of urethane linkage formation from isocyanate and polyol. The exemplified process is the reaction of TDI with polyepoxypropanediol.

As discussed, in a first aspect, preferred organosilane polymers for use in the present compositions are suitably obtainable or obtained from one or more alkoxy-silane reagents; and comprise a linear or branched chain structure. In this aspect, the organosilane polymers suitably may not include a cyclic Si-component such as a polyhedral Si—O group, or the oranosilane polymers suitably may be substantially free of a cyclic component such as a polyhedral Si—O group, i.e. less than 20, 15, 10, 9, 8, 7, 6, 5, 4, 3, 2, 1 or 0.5 of the total weight of the organosilane polymers is comprises of a cyclic Si-component such as a polyhedral Si—O group.

As discussed, in some preferred embodiments, the one or more organosilane polymers may include units having the following Formula (I):

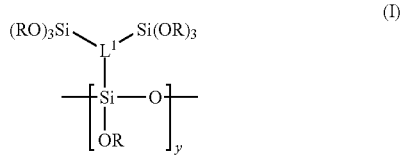

wherein in Formula (I): each R is the same or different and may be a hydrogen or non-hydrogen substituent; $L^1$ is a linker group; and y is a positive integer.

Preferred organosilanes include those that comprise units of the following Formula (IA) and/or (IB):

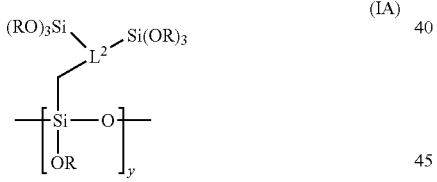

wherein in Formula (IA): each R is the same or different and may be a hydrogen or non-hydrogen substituent; $L^2$ is a linker group; and y is a positive integer;

wherein in Formula (IB) each R is the same or different and may be a hydrogen or non-hydrogen substituent; and y is a positive integer.

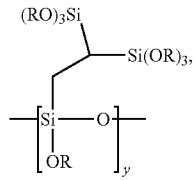

In certain preferred embodiments, the one or more organosilane polymers may include units having the following Formula (II):

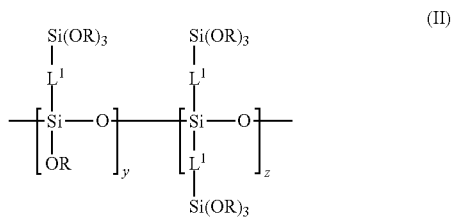

wherein in Formula (II): each R is the same or different and may be a hydrogen or non-hydrogen substituent; each $L^1$ is the same or different linker group; and y and z are the same or different and each is a positive integer.

Preferred organosilanes also include those that comprise units of the following Formula (IIA) and/or (IIB):

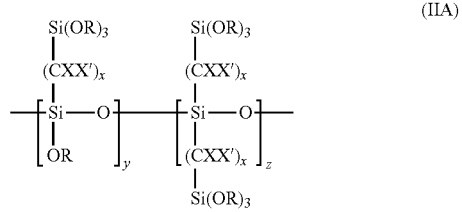

wherein in Formula (IIA): each R is the same or different and may be a hydrogen or non-hydrogen substituent; each X and X' is the same or different and may be hydrogen or a non-hydrogen substituent; each x is the same or different positive integer; and y and z are each the same or different positive integer;

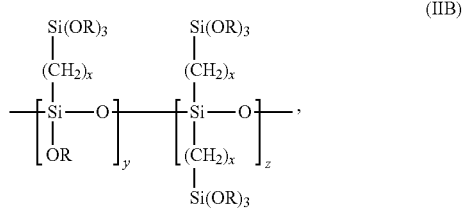

wherein in Formula (IIB): each R is the same or different and may be a hydrogen or non-hydrogen substituent; each x is the same or different positive integer; and y and z are each the same or different positive integer.

In Formulae (i) and (II), in some embodiments, each $L^1$ is a bond, alkylene, or heteroalkylene. In some embodiments, each $L^1$ is not a bond. In some embodiments, each $L^1$ is a $C_1$-$C_{20}$ alkylene which may be substituted or unsubstituted. In some embodiments, each $L^1$ is a $C_1$-$C_{10}$ alkylene which may be substituted or unsubstituted. In some embodiments, each $L^1$ is a $C_1$-$C_8$ alkylene which may be substituted or unsubstituted. In some embodiments, each $L^1$ is a $C_1$-$C_6$ alkylene which may be substituted or unsubstituted. In some embodiments, each $L^1$ is a $C_1$-$C_4$ alkylene which may be substituted or unsubstituted. In some embodiments, each $L^1$ is a $C_1$-$C_2$ alkylene which may be substituted or unsubstituted. In some embodiments, each $L^1$ is methylene or ethylene. In some embodiments, each $L^1$ is a heteroalkylene which may be substituted or unsubstituted. In some embodiments, each $L^1$ is a heteroalkylene including at least one selected from O, S, N, or P, which may be substituted or unsubstituted. In some embodiments, each $L^1$ is a 2 to 20 membered heteroalkylene including at least one selected from O, S, N, or P, which may be substituted or unsubstituted. In some embodiments, each $L^1$ is a 2 to 10 membered heteroalkylene including at least one selected from O, S, N, or P, which may be substituted or unsubstituted. In some embodiments, each $L^1$ is a 2 to 8 membered heteroalkylene including at least one selected from O, S, N, or P, which may be substituted or unsubstituted. In some embodiments, each $L^1$ is a 2 to 5 membered heteroalkylene including at least one selected from n S N, or P, which may be substituted or unsubstituted. In some embodiments, each $L^1$ is a 2 to 3 membered heteroalkylene including at least one selected from O, S, N, or P, which may be substituted or unsubstituted.

In Formula (IA) as set forth above, in some embodiments, each $L^2$ is a bond, alkylene, or heteroalkylene. In some embodiments, each $L^2$ is not a bond. In some embodiments, each $L^2$ is a $C_1$-$C_{20}$ alkylene which may be substituted or unsubstituted. In some embodiments, each $L^2$ is a $C_1$-$C_{10}$ alkylene which may be substituted or unsubstituted. In some embodiments, each $L^2$ is a $C_1$-$C_8$ alkylene which may be substituted or unsubstituted. In some embodiments, each $L^2$ is a $C_1$-$C_6$ alkylene which may be substituted or unsubstituted. In some embodiments, each $L^2$ is a $C_1$-$C_4$ alkylene which may be substituted or unsubstituted. In some embodiments, each $L^2$ is a $C_1$-$C_2$ alkylene which may be substituted or unsubstituted. In some embodiments, each $L^2$ is methylene or ethylene. In some embodiments, each $L^2$ is a heteroalkylene which may be substituted or unsubstituted. In some embodiments, each $L^2$ is a heteroalkylene including at least one selected from O, S, N, or P, which may be substituted or unsubstituted. In some embodiments, each $L^2$ is a 2 to 20 membered heteroalkylene including at least one selected from O, S, N, or P, which may be substituted or unsubstituted. In some embodiments, each $L^2$ is a 2 to 10 membered heteroalkylene including at least one selected from O, S, N, or P, which may be substituted or unsubstituted. In some embodiments, each $L^2$ is a 2 to 8 membered heteroalkylene including at least one selected from O, S, N, or P, which may be substituted or unsubstituted. In some embodiments, each $L^2$ is a 2 to 5 membered heteroalkylene including at least one selected from O, S, N, or P, which may be substituted or unsubstituted. In some embodiments, each $L^2$ is a 2 to 3 membered heteroalkylene including at least one selected from O, S, N, or P, which may be substituted or unsubstituted.

In Formula (IIA) as set forth above, in some embodiments, each X and X' (here, referring to upper case X and X' shown as (CXX')) is hydrogen. In some embodiments, each X and X' is other than hydrogen. In some embodiments, one or each of X and X' is alkyl, which may be substituted or unsubstituted. In some embodiments, one or each of X and X' is unsubstituted alkyl. In some embodiments, one or each of X and X' is unsubstituted $C_1$-$C_3$ alkyl. In some embodiments, each X and X' is ethyl. In some embodiments, each X and X' is methyl. In some embodiments, each X and X' is halogen (e.g., F, Cl, Br, or I).

In each of the above Formulae (I), (IA), (IB), (II), (IIA) and (IIB), in some embodiments, each R is the same or different and other than hydrogen. In some embodiments, each R is the same or different and may be alkyl, which may be substituted or unsubstituted. In some embodiments, R is unsubstituted alkyl. In some embodiments, R is unsubstituted $C_1$-$C_3$ alkyl. In some embodiments, each R is ethyl. In some embodiments, each R is methyl.

In each of the above Formulae (I), (IA), (IB), (II), (IIA) and (IIB), in some embodiments, each R is independently selected from the group consisting of $C_1$-$C_{15}$ alkyl, $C_2$-$C_{15}$ alkenyl, —NCO, —CH(O)$CH_2$, —$NH_2$, —$NHC_1$-$C_6$ alkyl, —OC(O)$NHC_1$-$C_6$ alkyl, OC(O)$NH_2$, —P(O)(O$C_1$-$C_6$ alkyl)$_2$, —$C_1$-$C_6$ alkylSi($C_1$-$C_6$ alkyl)$_3$, —$C_1$-$C_6$ alkylSi($C_1$-$C_6$ alkyl)$_2$(O$C_1$-$C_6$ alkyl), —$C_1$-$C_6$ alkylSi($C_1$-$C_6$ alkyl)(O$C_1$-$C_6$ alkyl)$_2$, —$C_1$-$C_6$ alkylSi(O$C_1$-$C_6$ alkyl)$_3$, —Si($C_1$-$C_6$ alkyl)$_2$(O$C_1$-$C_6$ alkyl), —Si($C_1$-$C_6$ alkyl)(O$C_1$-$C_6$ alkyl)$_2$ and —Si(O$C_1$-$C_6$ alkyl)$_3$, wherein one or more hydrogen atoms in $C_1$-$C_{15}$ alkyl or $C_1$-$C_6$ alkyl is independently optionally substituted with a —OC(O)$C_1$-$C_4$ alkenyl, —NCO, —(O$C_1$-$C_4$ alkyl)-CH(O)$CH_2$, —CH(O)$CH_2$, —$NH_2$, —$NHC_1$-$C_4$ alkyl, —OC(O)$NHC_1$-$C_4$ alkyl, —OC(O)$NH_2$, —P(O)(O$C_1$-$C_4$ alkyl)$_2$, —Si($C_1$-$C_4$ alkyl)$_2$(O$C_1$-$C_4$ alkyl), —Si($C_1$-$C_4$ alkyl)(O$C_1$-$C_4$ alkyl)$_2$ or —Si(O$C_1$-$C_4$ alkyl)$_3$.

In each of the above Formulae (I), (IA), (IB), (II), (IIA) and (IIB), in some embodiments, y is an integer from 1 to 1000. In some embodiments, y is an integer from 1 to 900. In some embodiments, y is an integer from 1 to 800. In some embodiments, y is an integer from 1 to 700. In some embodiments, y is an integer from 1 to 600. In some embodiments, y is an integer from 1 to 500. In some embodiments, y is an integer from 1 to 400. In some embodiments, y is an integer from 1 to 300. In some embodiments, y is an integer from 1 to 200. In some embodiments, y is an integer from 1 n to 100. In some embodiments, y is an integer from 1 to 90. In some embodiments, y is an integer from 1 to 80. In some embodiments, y is an integer from 1 to 70. In some embodiments, y is an integer from 1 to 60. In some embodiments, y is an integer from 1 to 50. In some embodiments, y is an integer from 1 to 40. In some embodiments, y is an integer from 1 to 30. In some embodiments, y is an integer from 1 to 20. In some embodiments, y is an integer from 1 to 10.

In each of the above Formulae (II), (IIA) and (IIB), in some embodiments, z is an integer from 0 to 1000. In some embodiments, z is an integer from 0 to 900. In some embodiments, z is an integer from 0 to 800. In some embodiments, z is an integer from 0 to 700. In some embodiments, z is an integer from 0 to 600. In some embodiments, z is an integer from 0 to 500. In some embodiments, z is an integer from 0 to 400. In some embodiments, z is an integer from 0 to 300. In some embodiments, z is an integer from 0 to 200. In some embodiments, z is an integer from 0 to 100. In some embodiments, z is an integer from 0 to 90. In some embodiments, z is an integer from 0 to 80. In some embodiments, z is an integer from 0 to 70. In some embodiments, z is an integer from 0 to 60. In some embodiments, z is an integer from 0 to 50. In some embodiments, z is an integer from 0 to 40. In some embodiments, z is an integer from 0 to 30. In some embodiments, z is an integer from 0 to 20. In some embodiments, z is an integer from 0 to 10.

In each of the above Formula (IIA) and (IIB), in some embodiments, x (here referring to lower case x, which is distinguished from upper case X and X' shown in Formula (IIA) as (CXX')) is an integer from 1 to 30. In some embodiments, x is an integer from 1 to 20. In some embodiments, x is an integer from 1 to 10. In some embodiments, x is an integer from 1 to 9. In some embodiments, x is an integer from 1 to 8. In some embodiments, x is an integer from 1 to 7. In some embodiments, x is an integer from 1 to 6. In some embodiments, x is an integer from 1 to 5. In some embodiments, x is an integer from 1 to 4. In some embodiments, x is an integer from 1 to 9. In some embodiments, x is an integer from 1 to 3. In some embodiments, x is an integer from 1 to 9. In some embodiments, x is an integer from 1 to 2. In some embodiments, x is 1.

As discussed, in a second aspect, the one or more organosilane polymers include units of the following Formula (III), (IV) or (V):

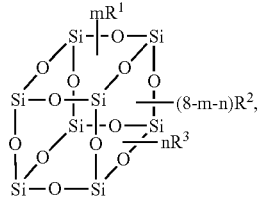

(III)

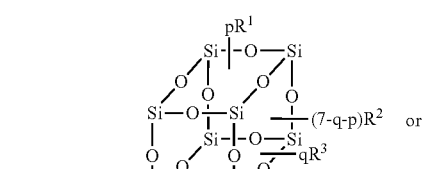

(IV)

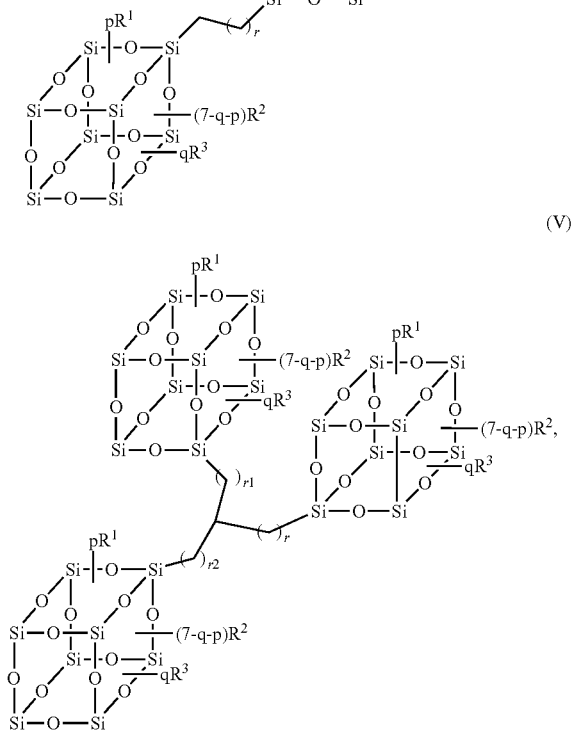

(V)

wherein in those Formula (III), (IV) and (V):

$R^1$ is a long chain alkyl or long chain fluorinated alkyl;

$R^2$ and $R^3$ are each independently selected from the group consisting of $C_1$-$C_{15}$ alkyl, $C_2$-$C_{15}$ alkenyl, —NCO, —CH(O)CH$_2$, —NH$_2$, —NHC$_1$-C$_6$ alkyl, —OC(O) NHC$_1$-C$_6$ alkyl, —OC(O)NH$_2$, —P(O)(OC$_1$-C$_6$ alkyl)$_2$, —C$_1$-C$_6$ alkylSi(C$_1$-C$_6$ alkyl)$_3$, —C$_1$-C$_6$ alkylSi(C$_1$-C$_6$ alkyl)$_2$(OC$_1$-C$_6$ alkyl), —C$_1$-C$_6$ alkylSi(C$_1$-C$_6$ alkyl)(OC$_1$-C$_6$ alkyl)$_2$-C$_1$-C$_6$ alkylSi(OC$_1$-C$_6$ alkyl)$_3$, —Si(C$_1$-C$_6$ alkyl)$_2$(OC$_1$-C$_6$ alkyl), —Si(C$_1$-C$_6$ alkyl)(OC$_1$-C$_6$ alkyl)$_2$ and —Si(OC$_1$-C$_6$ alkyl)$_3$, wherein one or more hydrogen atoms in C$_1$-C$_{15}$ alkyl or C$_1$-C$_6$ alkyl is independently optionally substituted with a OC(O)C$_1$-C$_4$ alkenyl, —NCO, —(OC$_1$-C$_4$ alkyl)-CH(O)CH$_2$, —CH(O)CH$_2$, —NH$_2$, —NHC$_1$-C$_4$ alkyl, —OC(O)NHC$_1$-C$_4$ alkyl, —OC(O)NH$_2$, —P(O) (OC$_1$-C$_4$ alkyl)$_2$, —Si(C$_1$-C$_4$ alkyl)$_2$(OC$_1$-C$_4$ alkyl), —Si(C$_1$-C$_4$ alkyl)(OC$_1$-C$_4$ alkyl)$_2$ or —Si(OC$_1$-C$_4$ alkyl)$_3$;

m is an integer from 0 to 7;
n is an integer from 0 to 7;
p is an integer from 0 to 6;
q is an integer from to 6;
wherein the sum of n and m is less than or equal to 7; and the sum of p and q is less than or equal to 6.

In various embodiments of the disclosure, the end functionalities employed on $R^2$ and/or $R^3$ can be consistent with organosilane-based or isocyanate-based surface treatment. For example, in some embodiments, the end functionality on $R^2$ and/or $R^3$ can be —Si(OC$_1$-C$_6$ alkyl)$_3$.

In such embodiments, the adhesion promoter can find use in articles that require, for example, covalent bonding of a top coat to a glass surface through the formation of stable —Si—O—Si— bonds. For example, $R^2$ and $R^3$ can be C$_1$-C$_{15}$ alkyl, wherein one or more hydrogen atoms in C$_1$-C$_{15}$ alkyl is substituted with —Si(OC$_1$-C$_6$ alkyl)$_3$. More particularly, in this embodiment, $R^2$ and $R^3$ can be —CH$_2$CH$_2$Si(OCH$_2$CH$_3$)$_3$. In such an embodiment, the adhesion promoter can provide a higher density of active trialkoxy silane groups than the commercially available organosilane adhesion promoters, thus allowing the adhesion promoter to form more covalent bonds to a surface of a substrate and a top coat, such as an omniphobic coating.

In other embodiments, the end functionality on $R^2$ and/or $R^3$ can be —NCO. In such embodiments, the adhesion promoter can find use in articles that require, for example, covalent bonding of a top coat, such as a polymer, to a surface through the formation of urethane bonds. For example, $R^2$ and $R^3$ can be C$_1$-C$_{15}$ alkyl, wherein one or more hydrogen atoms in C$_1$-C$_5$ alkyl is substituted with —NCO. More particularly, in this embodiment, $R^2$ and $R^3$ can be —CH$_2$CH$_2$CH$_2$NCO. In such embodiments, the adhesion promoter can provide a higher density of reactive functional groups to form urethane bonds to a surface of a substrate and a top coat, such as a polymer coating.

In other embodiments, the end functionality on $R^2$ and/or $R^3$ can be —NH$_2$. In such embodiments, the adhesion promoter can find use in articles that require, for example, covalent bonding of a top coat, such as a urethane polymer, to a surface through the formation of urea bonds. For example, $R^2$ and $R^3$ can be C$_1$-C$_{15}$ alkyl, wherein one or more hydrogen atoms in C$_1$-C$_{15}$ alkyl is substituted with —NH$_2$. More particularly, in this embodiment, $R^2$ and $R^3$ can be —CH$_2$CH$_2$CH$_2$NH$_2$. In such embodiments, the adhesion promoter can provide a higher density of reactive functional groups to form urea bonds to a surface of a substrate and a top coat, such as a urethane polymer coating.

In some embodiments of the disclosure, the end functionalities employed on $R^2$ and $R^3$ can also incorporate functional groups necessary for covalently bonding the adhesion promoter to various top coats. For example, in some embodiments, the end functionality on $R^2$ can be —NCO, while the end functionality on $R^1$ can be —(OC$_1$-C$_6$ alkyl)-CH(O)CH$_2$. More particularly, in some embodiments, the end functionality on $R^2$ can be —NCO, while the end functionality in $R^3$ can be —OCH$_2$CH(O)CH$_2$. More particularly, in some embodiments, $R^2$ can be C$_1$-C$_{15}$ alkyl, wherein one or more hydrogen atoms in C$_1$-C$_{15}$ alkyl is substituted with —NCO, and $R^3$ can be C$_1$-C$_{15}$ alkyl, wherein one or more hydrogen atoms in C$_1$-C$_{15}$ alkyl is substituted with —(OC$_1$-C$_6$ alkyl)-CH(O)CH$_2$. More particularly, in some embodiments, $R^2$ can be —CH$_2$CH$_2$CH$_2$NCO, and $R^3$ can be —CH$_2$CH$_2$CH$_2$(OCH$_2$)CH(O)CH$_2$ (a.k.a. 3-glycidoxypropyl). In such embodiments, the adhesion promoter can provide a higher density of reactive functional groups to form urethane bonds to a surface of a substrate and a top coat through the reaction of the epoxide moiety in the 3-glycidyloxy, such as a polymer coating.

It will be appreciated by one of skill in the art that various other embodiments of adhesion promoters are contemplated by the present disclosure. In some embodiments, m is 0. In some embodiments, n is 0. In some embodiments, m is 0, and n is an integer from 1 to 7. In some embodiments, m is 0, and n is 1. In some embodiments, m is 0, and n is 2. In some embodiments, m is 0, and n is 3. In some embodiments, m is 0, and n is 4. In some embodiments, m is 0, and n is 5. In some embodiments, m is 0, and n is 6. In some embodiments, m is 0, and n is 7.

In some embodiments, m is 0 and n is an integer from 1 to 7, such that the adhesion promoter is a Gaussian distribution of compounds of the formula (I). In some embodiments, p is 0. In some embodiments, q is 0. In some embodiments, p is 0, and q is an integer from 1 to 6. In some embodiments, p is 0, and q is 1. In some embodiments, p is 0, and n is q. In some embodiments, p is 0, and q is 3. In some embodiments, p is 0, and q is 4. In some embodiments, p is 0, and q is 5. In some embodiments, p is 0, and q is 6. In some embodiments, p is 0, and q is 7. In some embodiments, p is 0 and q is an integer from 1 to 7, such that the adhesion promoter is a Gaussian distribution of compounds of the formula (e.g. compounds of Formula (IV) or (V)).

Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in a patent, application, or other publication that is herein incorporated by reference, the definition set forth in this section prevails over the definition incorporated herein by reference.

As used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As used herein, the terms "including," "containing," and "comprising" are used in their open, non-limiting sense.

As used herein, the term "alkyl" includes a chain of carbon atoms, which is optionally branched and contains from 1 to 20 carbon atoms. It is to be further understood that in certain embodiments, alkyl may be advantageously of limited length, including C$_1$-C$_{12}$, C$_1$-C$_{10}$, C$_1$-C$_9$, C$_1$-C$_8$, C$_1$-C$_7$, C$_1$-C$_6$, and C$_1$-C$_4$, Illustratively, such particularly limited length alkyl groups, including C$_1$-C$_8$, C$_1$-C$_7$, C$_1$-C$_6$, and C$_1$-C$_4$, and the like may be referred to as "lower alkyl." Illustrative alkyl groups include, but are not limited to, methyl, ethyl, n-propyl, isopropyl, n-butyl, isobutyl, sec-butyl, tert-butyl, pentyl, 2-pentyl, 3-pentyl, neopentyl, hexyl, heptyl, octyl, and the like. Alkyl may be substituted or unsubstituted. Typical substituent groups include cycloalkyl, aryl, heteroaryl, heteroalicyclic, hydroxy, alkoxy, aryloxy, mercapto, alkylthio, arylthio, cyano, halo, carbonyl, oxo, (=O), thiocarbonyl, O-carbamyl, N-carbamyl, O-thiocarbamyl, N-thiocarbamyl, C-amido, N-amido, C-carboxy, O-carboxy, nitro, and amino, or as described in the various embodiments provided herein. It will be understood that "alkyl" may be combined with other groups, such as those provided above, to form a functionalized alkyl. By way of example, the combination of an "alkyl" group, as described herein, with a "carboxy" group may be referred to as a "carboxyalkyl" group. Other non-limiting examples include hydroxyalkyl, aminoalkyl, and the like.

As used herein, the term "alkenyl" includes a chain of carbon atoms, which is optionally branched, and contains from 2 to 20 carbon atoms, and also includes at least one carbon-carbon double bond (i.e. C=C). It will be understood that in certain embodiments, alkenyl may be advantageously of limited length, including C$_2$-C$_{12}$, C$_2$-C$_9$, C$_2$-C$_8$, C$_2$-C$_7$, C$_2$-C$_6$, and C$_2$-C$_4$. Illustratively, such particularly limited length alkenyl groups, including C$_2$-C$_8$, C$_2$-C$_7$, C$_2$-C$_6$, and C$_2$-C$_4$ may be referred to as lower alkenyl. Alkenyl may be unsubstituted, or substituted as described for alkyl or as described in the various embodiments provided herein. Illustrative alkenyl groups include, but are not limited to, ethenyl, 1-propenyl, 2-propenyl, 1-, 2-, or 3-butenyl, and the like.

As used herein, the term "aryl" refers to an all-carbon monocyclic or fused-ring polycyclic groups of 6 to 12 carbon atoms having a completely conjugated pi-electron system. It will be understood that in certain embodiments, aryl may be advantageously of limited size such as C$_6$-C$_{10}$ aryl. Illustrative aryl groups include, but are not limited to, phenyl, naphthalenyl and anthracenyl. The aryl group may be unsubstituted, or substituted as described for alkyl or as described in the various embodiments provided herein.

As used herein, the term "cycloalkyl" refers to a 3 to 15 member all-carbon monocyclic ring, an all-carbon 5-member/6-member or 6-member/6-member fused bicyclic ring, or a multicyclic fused ring (a "fused" ring system means that each ring in the system shares an adjacent pair of carbon atoms with each other ring in the system) group where one or more of the rings may contain one or more double bonds but the cycloalkyl does not contain a completely conjugated pi-electron system. It will be understood that in certain embodiments, cycloalkyl may be advantageously of limited size such as C$_3$-C$_{13}$, C$_3$-C$_6$, C$_3$-C$_6$ and C$_4$-C$_6$. Cycloalkyl may be unsubstituted, or substituted as described for alkyl or as described in the various embodiments provided herein. Illustrative cycloalkyl groups include, but are not limited to, cyclopropyl, cyclobutyl, cyclopentyl, cyclopentenyl, cyclopentadienyl, cyclohexyl, cyclohexenyl, cycloheptyl, adamantyl, norbornyl, norbornenyl, 9H-fluoren-9-yl, and the like.

As used herein, the term "heterocycloalkyl" refers to a monocyclic or fused ring group having in the ring(s) from 3 to 12 ring atoms, in which at least one ring atom is a heteroatom, such as nitrogen, oxygen or sulfur, the remaining ring atoms being carbon atoms. Heterocycloalkyl may optionally contain 1, 2, 3 or 4 heteroatoms. Heterocycloalkyl may also have one of more double bonds, including double bonds to nitrogen (e.g. C=N or N=N) but does not contain a completely conjugated pi-electron system. It will be understood that in certain embodiments, heterocycloalkyl may be advantageously of limited size such as 3- to 7-membered heterocycloalkyl, 5- to 7-membered heterocycloalkyl, and the like. Heterocycloalkyl may be unsubstituted, or substituted as described for alkyl or as described in the various embodiments provided herein. Illustrative heterocycloalkyl groups include, but are not limited to, oxiranyl (which is described herein by the formula —CH(O)CH$_2$ as in —CH$_2$CH(O)CH$_2$), thianaryl, azetidinyl, oxetanyl, tetrahydrofuranyl, pyrrolidinyl, tetrahydropyranyl, piperidinyl, 1,4-dioxanyl, morpholinyl, 1,4-dithianyl, piperazinyl, oxepanyl, 3,4-dihydro-2H-pyranyl, 5,6-dihydro-2H-pyranyl, 2H-pyranyl, 1, 2, 3, 4-tetrahydropyridinyl, and the like.

As used herein, the term "heteroaryl" refers to a monocyclic or fused ring group of 5 to 12 ring atoms containing one, two, three or four ring heteroatoms selected from nitrogen, oxygen and sulfur, the remaining ring atoms being carbon atoms, and also having a completely conjugated pi-electron system. It will be understood that in certain embodiments, heteroaryl may be advantageously of limited size such as 3- to 7-membered heteroaryl, 5- to 7-membered heteroaryl, and the like. Heteroaryl may be unsubstituted, or substituted as described for alkyl or as described in the various embodiments provided herein. Illustrative heteroaryl groups include, but are not limited to, pyrrolyl, furanyl, thiophenyl, imidazolyl, oxazolyl, thiazolyl, pyrazolyl, pyridinyl, pyrimidinyl, quinolinyl, isoquinolinyl, purinyl, tetrazolyl, triazinyl, pyrazinyl, tetrazinyl, quinazolinyl, quinoxalinyl, thienyl, isoxazolyl, isothiazolyl, oxadiazolyl, thiadiazolyl, triazolyl, benzimidazolyl, benzoxazolyl, benzthiazolyl, benzisoxazolyl, benzisothiazolyl and carbazoloyl, and the like.

As used herein, "hydroxy" or ""hydroxyl" refers to an —OH group.

As used herein, "alkoxy" refers to both an —O-(alkyl) or an —O-(unsubstituted cycloalkyl) group. Representative examples include, but are not limited to, methoxy, ethoxy, propoxy, butoxy, cyclopropyloxy, cyclobutyloxy, cyclopentyloxy, cyclohexyloxy, and the like.

As used herein, "aryloxy" refers to an —O-aryl or an —O-heteroaryl group. Representative examples include, but are not limited to, phenoxy, pyridinyloxy, furanyloxy, thienyloxy, pyrimidinyloxy, pyrazinyloxy, and the like, and the like.

As used herein, "mercapto" refers to a —SH group.

As used herein, "alkylthio" refers to a —S-(alkyl) or a —S-(unsubstituted cycloalkyl) group. Representative examples include, but are not limited to, methylthio, ethylthio, propylthio, butylthio, cyclopropylthio, cyclobutylthio, cyclopentylthio, cyclohexylthio, and the like.

As used herein, "arylthio" refers to an —S-aryl or an —S-heteroaryl group. Representative examples include, but are not limited to, phenylthio, pyridinylthio, furanylthio, thienylthio, pyrimidinylthio, and the like.

As used herein, "halo" or "halogen" refers to fluorine, chlorine, bromine or iodine.

As used herein, "trihalomethyl" refers to a methyl group having three halo substituents, such as a trifluoromethyl group.

As used herein, "cyano" refers to a —CN group.

As used herein, "sulfinyl" refers to a —S(O)R$^a$ group, where R$^a$ is any variable group as described in the various embodiments provided herein, or R$^a$ may be a hydroxyl group.

As used herein, "sulfonyl" refers to a —S(O)$_2$R$^a$ group, where R$^a$ is any variable group as described in the various embodiments provided herein, or R$^a$ may be a hydroxyl group.

As used herein, "S-sulfonamido" refers to a —S(O)$_2$NR$^a$R$^b$ group, where R$^a$ and R$^b$ are any variable group as described in the various embodiments provided herein.

As used herein, "N-sulfonamido" refers to a —NR$^a$S(O)$_2$R$^b$ group, where R$^a$ and R$^b$ are any variable group as described in the various embodiments provided herein.

As used herein, "O-carbamyl" refers to a —OC(O)NR$^a$R$^b$ group, where R$^a$ and R$^b$ are any variable group as described in the various embodiments provided herein.

As used herein, "N-carbamyl" refers to an R$^a$OC(O)NR$^b$— group, where R$^a$ and R$^b$ are any variable group as described in the various embodiments provided herein.

As used herein, "O-thiocarbamyl" refers to a —OC(S)NR$^a$R$^b$ group, where R$^a$ and R$^b$ are any variable group as described in the various embodiments provided herein.

As used herein, "N-thiocarbamyl" refers to a R$^a$OC(S)NR$^b$— group, where R$^a$ and R$^b$ are any variable group as described in the various embodiments provided herein.

As used herein, "amino" refers to an —NR$^a$R$^b$ group, where R$^a$ and R$^b$ are any variable group as described in the various embodiments provided herein.

As used herein, "C-amido" refers to a —C(O)NR$^a$R$^b$ group, where R$^a$ and R$^b$ are any variable group as described in the various embodiments provided herein.

As used herein, "N-amido" refers to a R$^a$C(O)NR$^b$— group, where R$^a$ and R$^b$ are any variable group as described in the various embodiments provided herein.

As used herein, "nitro" refers to a —NO$_2$ group.

Silsesquioxanes are organo-silicon and suitably may have a chemical formula of $[RSiO_{3/2}]_n$ (where R is suitably H, alkyl, alkoxy and the like and n is a positive integer). Silsesquioxanes can adopt cage-like or polymeric structures with Si—O—Si linkages and Si vertices. In certain aspects herein, preferred silsesquioxanes can have cage-like or polyhedral structures such as a cube, hexagonal prism, octagonal prism, decagonal prism, or dodecagonal prism. In exemplary embodiments, of the various possible organosilane polymer unit, for example, having cage molecular structures, the cube-like ("T8") cage structure is formed. As used herein, the cube-like ("T8") cage structure may be optionally substituted such as by a fluorinated alkyl group, or a group bearing a reactive functionality such as an alkylsilane or an alkylisocyanate.

In exemplary embodiments, the present disclosure provides organosilane polymer compositions made of a blend of feedstock materials. In one exemplary embodiment, a first feedstock comprises a first trialkoxysilane, and optionally a second feedstock comprises a trialkoxysilane, and optionally a third feedstock comprises a trialkoxysilane. Each trialkoxysilane has a distinct carbon chain length C. In exemplary embodiments, C is in a range of 1-10. In exemplary embodiments, C is in a range of 2-4. In exemplary embodiments, C is 2, 4, 6, 8 or 10. In exemplary embodiments, a first feedstock may be fluorinated alkyl or alkyl trialkoxysilane, such as a C6 fluoroalkyl molecule trialkoxysilane, and the second feedstock may be a trialkoxysilane molecule. In alternative embodiments, one of the feedstocks used is a fluorinated alkyl or alkyl trialkoxysilane.

As used herein, the term "long-chain fluorinated alkyl" means any straight chain or branched chain alkyl group having from 5 to 12 carbon atoms in the longest continuous chain of carbon atoms as counted from the point of attachment of the chain of carbon atoms to the silicon atom at any apex of the silicon-oxide core, where at least one hydrogen atom in the straight chain or branched chain alkyl group is replaced by a fluorine atom. Any number of hydrogen atoms in the straight chain or branched chain alkyl group can be replaced with fluorine atoms within the meaning of "long-chain fluorinated alkyl" as used herein. For example, the terminal methyl group of a straight chain alkyl group having six carbon atoms in the chain (e.g. a hexyl group) can have each of the pendent hydrogen atoms replaced by a fluorine atom (e.g. a trifluoromethyl) to provide a long chain fluorinated alkyl group having the formula —$CH_2CH_2CH_2CH_2CH_2CF_3$. In another example, the last two carbon atoms of a straight chain alkyl group having six carbon atoms in the chain can have each of the pendent hydrogen atoms replaced by a fluorine atom (e.g. a trifluoroethyl) to provide a long chain fluorinated alkyl group having the formula —$CH_2CH_2CH_2CH_2CF_2CF_3$. This exemplary pattern can be continued to include within the definition of "long chain fluorinated alkyl" groups of the formula —$CH_2CH_2CH_2CF_2CF_2CF_3$, —$CH_2CH_2CF_2CF_2CF_2CF_3$, —$CH_2CF_2CF_2CF_2CF_2CF_3$, and —$CF_2CF_2CF_2CF_2CF_2CF_3$. As is commonly known in the art, an alkyl group where every hydrogen atom in the chain is replaced by a fluorine atom is known as a "perfluorinated" alkyl group. In some embodiments, the term perfluorinated is used in connection with a group where some carbon atoms are defined to have hydrogen atoms bonded thereto, while other carbon atoms have all fluorine atoms bonded thereto. For example, the nomenclature 1H, 1H, 2H, 2H perfluorooctyltriethoxysilane describes a compound in which the two terminal carbon atoms at the point of covalent attachment of the chain to the F-organosilane polymers (e.g., F— oligomeric silsesquioxane (POSS) or F-POSS) have hydrogen atoms bound to the carbon atom, while the remainder of the carbon atoms in the chain have fluorine atoms bonded thereto and are thus are perfluorinated.

As used herein, "optional" or "optionally" (or stating "substituted or unsubstituted") means that the subsequently described event or circumstance may but need not occur, and that the description includes instances where the event or circumstance occurs and instances in which it does not. For example, "heterocycle group optionally substituted with an alkyl group" means that the alkyl may but need not be present, and the description includes situations where the heterocycle group is substituted with an alkyl group and situations where the heterocycle group is not substituted with the alkyl group.

As used herein, "independently" means that the subsequently described event or circumstance is to be read on its own relative to other similar events or circumstances. For example, in a circumstance where several equivalent hydrogen groups are optionally substituted by another group described in the circumstance, the use of "independently optionally" means that each instance of a hydrogen atom on the group may be substituted by another group, where the groups replacing each of the hydrogen atoms may be the same or different. Or for example, where multiple groups exist all of which can be selected from a set of possibilities, the use of "independently" means that each of the groups can be selected from the set of possibilities separate from any other group, and the groups selected in the circumstance may be the same or different.

The organosilanes are disclosed herein may be readily prepared. See for instance, the exemplary syntheses set forth in the examples which follow. Examples 1-14 below are illustrative examples for preparation of non-cyclic polymers of the first aspect. Examples 15-20 below are illustrative examples for preparation of polymers having a polyhedral Si-structure of the second aspect.

Organosilyl compounds have been developed as adhesion promoters. Without being bound by theory, it is believed that a mechanism of organosilanes involves hydrolysis and condensation during covalent bond formation. Since organosilyl compounds have more reactive bond moiety such as the silicon hydride (Si—H) than the carbon-hydrogen (C—H) bond, those can form a reactive silanol (Si—OH) functional group via hydrolysis. See, for example FIG. 1, showing the process for silane covalent bond formation to a substrate. Depending on the nature of the hydrolysable groups attached to the silicon, various silane groups are known, such as chlorosilanes, silazanes, alkoxysilanes, and acyloxysilanes. Each silane provides different chemical reactivity to contribute to hydrolysis and condensation. For example, a molecule containing a chlorosilyl group can react with atmospheric moisture or water adsorbed on a surface to form silanol (Si—OH), while liberation of the by-product (HCl) occurs. The silanol group can react with other silanols to form a stable siloxane bond (—Si—O—Si—). In the presence of hydroxyl groups at the surface of glass, minerals, or metals, silanol group forms a stable M-O—Si bond (M=Si, Al, Fe, etc.). This chemistry allows silanes to function as adhesion promoting agents.

A benefit of incorporating polysiloxane formation of the invention on a substrate, especially a glass substrate, for this type of product is two-fold. Firstly, it can provide enhanced adhesion, especially under the effect of aerodynamic forces or mechanical motions, for example in the case of a moving vehicle. Secondly, polysiloxane formation endows strong chemical resistance due to enhanced adhesion, especially under the strong acidic/basic or organic solvent environment. To enhance polysiloxane formation on a substrate, it is important to integrate hydrolysable groups such as an alkoxysilane on adhesion promoters. Accordingly the adhesion promoters described herein include oligomeric silsesquioxane as a platform for integrate hydrolysable groups. By using the adhesion promoters, for example, hydrolysable groups can be disposed or attached on the ends groups of the Formula (I), (II), (IA), (IB), (IIA), or (IIB). Alternatively, by using the adhesion promoters, for example, hydrolysable groups can be corner-capped on the eight corners of the Formula (III), (IV) or (V). As a result, the density of hydrolysable groups per given molecule can be maximized, and the properties of the adhesion promoter can be enhanced.

A benefit of incorporating adhesion promoters of the invention on a substrate is two-fold. Firstly, it provides enhanced adhesion, especially under the effect of aerodynamic forces or mechanical motions, for example in the case of a moving vehicle. Secondly, polyurethane linkage formation imparts strong mechanical adhesion and chemical resistance due to enhanced adhesion, especially under the strong acidic/basic or organic solvent environment.

In order to lead multiple urethane linkage formation on a substrate, a key is to integrate the maximum isocyanates on given molecules. In this patent, an agent known for oligomeric silsesquioxane (POSS) has been used for a platform.

Figure 3:
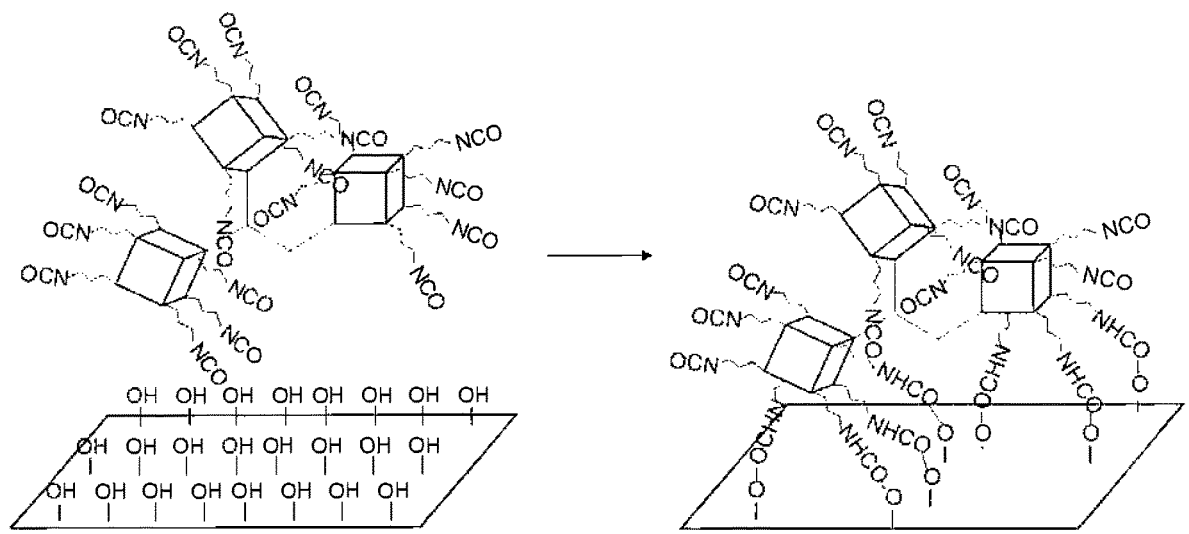
FIG. 3 is a schematic illustration of formation covalent bonding of organosilane polymers with active polar groups (urethane linkage formation).
Figure 4:
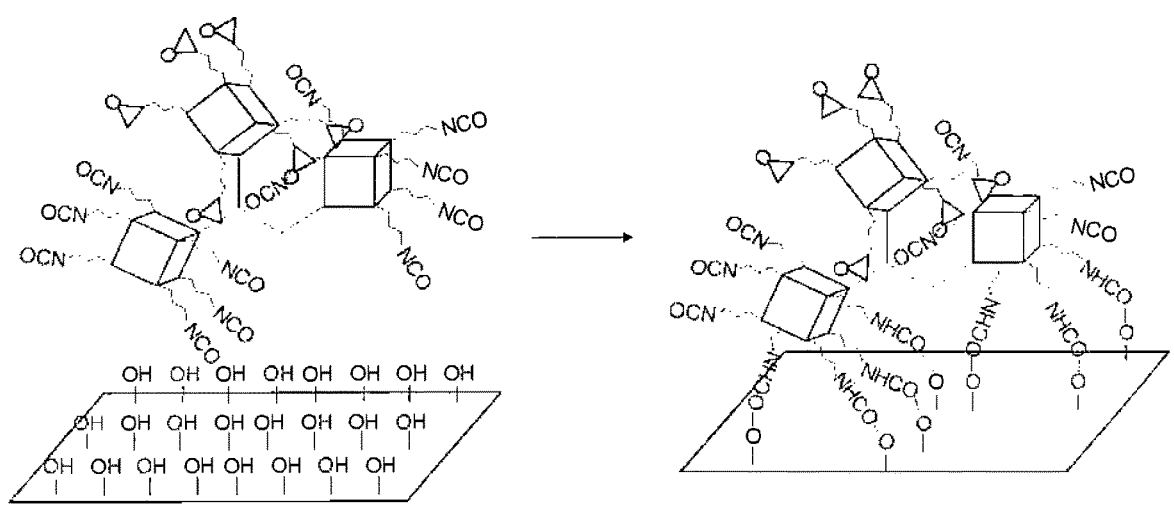
FIG. 4 is a schematic illustration of formation of covalent bonding of hybrid organosilane polymers with active polar groups (urethane linkage formation).

By using POSS platform, isocyanate groups can be attached as pendant groups on the eight corners of the POSS as shown in FIG. 3. Depending on the number of isocyanate pendant groups, the density of isocyanates per given molecule can be maximized. Neumann (D. Neumann, M. Fisher, L. Tran, J. G. Matison, "Synthesis and characterization of an isocyanate functionalized polyhedral silsesquioxane and the subsequent formation of an organic-inorganic hybrid polyurethane", JACS 124 (2002), 13998-13999) and Mya (K. Y. Mya, Y. Wang, L. Shen, J. Xu, Y. Wu, X. Lu, C He, "Star-like polyurethane hybrids with functional cubic silsesquioxanes: Preparation, morphology, and thermomechanical properties", J. Polymer Sci.: Part A:Polymer Chem. 47 (2009) 4602-4616) reported an isocyanate functionalized adhesion promoters.

One advantage of the adhesion promoters of the present disclosure is that these materials can be applied to activated polar surfaces without additional polyol. As shown in FIG. 3, isocyanates on the adhesion promoter directly react with abundant hydroxyl groups, which can be activated by plasma treatment or acid etching (Piranha solution) and form urethane linkages.

An underlying coating composition can be hardened after applying as a coating layer such as by thermal treatment.

The present coating compositions also may contain other materials. For example, other optional additives include nanoparticles such as $SiO_2$, $TiO_2$, $Al_2O_3$, $Al(OH)_3$, ZnO, $Sb_2O_3$, $Fe_2O_3$, $CeO_2$, etc. Such optional additives typically will be present in minor concentration in a composition.

Composition components suitably may be present in varying amounts. For instance, the weight ratio 1) the one or more organosilanes the 2) one or more compounds that comprise one or more substituted acrylate, acrylamide or vinyl ether moieties suitably may be 1:10 to 10:1, more typically, a weight ratio of 2:8 to 8:2 or 3:7 to 7:3. In certain aspects, a weight ratio of 1) the one or more organosilanes the 2) one or more compounds that comprise one or more substituted acrylate, acrylamide or vinyl ether moieties suitably may be 4:6 to 6:4.

A curing agent if employed typically will be present in relatively minor amounts such as less than 10, 5, 4, 3, 2 or 1 weight percent of the total composition weight.

As discussed, preferred compositions do not include an additional solvent component, rather reactive composition component(s) are dissolved or dispersed together to provide a fluid solution or mixture. If desired, however, one or more carrier solvents may be utilized to impart desired viscosity and other characteristics to the composition. One or more organic solvents are generally preferred such as for example an alcohol such as ethanol, methanol, propanol, mixtures thereof and the like, glycol ethers such as 2-methoxyethyl ether (diglyme), ethylene glycol monomethyl ether, and propylene glycol monomethyl ether; propylene glycol monomethyl ether acetate; lactates ethyl lactate; propionates such as ethyl ethoxy propionate and methyl-2-hydroxy isobutyrate; and ketones such as methylethyl ketone and 2-heptanone. A blend of solvents such as a blend of two, three or more of the solvents described above may be suitable. If utilized, a solvent component may be suitably present in the composition in an amount of from 50 to 90 or 95 wt % based on the total composition weight.

The present compositions are generally prepared by admixing the composition components followed by agitation such as mechanical stirring or ultrasonication to provide a substantially uniform fluid composition. A composition may be applied to a substrate by any suitable method, including spin coating spray coating or dip coating.

Following applying a composition coating layer on a substrate, the layer is hardened as discussed typically either by thermal treatment effectively harden a specific composition.

Top Coats

There is no particular restriction as to the top coat to be applied in connection with the processes and articles described herein. The identity of the top coat can be dependent on such factors as the application or industry for which the article being manufactured will used, the type of substrate to which the top coat is being applied, the chemical and/or physical characteristics desired for the coated surface, and the like. For example, in some embodiments, it may be desirable to prepare a coated substrate having an omniphobic coating, such as on a glass substrate for use in, for example, the automotive field as a windshield. In such an exemplary embodiment, the omniphobic coating can be a fluorinated silane, such as $C_8F_{17}(CH_2)_2Si(OEt)_3$ or an F-FPOSS as described in WO 2016/201028, incorporated herein by reference. In the current disclosure, the use of a adhesion promoters adhesion promoter as described herein comprising silane functionalities, with or without an additional adhesion promoter as described herein, can provide a coated substrate having improved properties, such as improved durability.

Exemplary top coats for use in connection with silane-based top coats in connection with adhesion promoters as described herein include, but are not limited to, fluorinated alkyl silanes, alkyl silanes, functionalized alkyl silanes, TEOS, F-adhesion promoters, thiol or hydroxylated alkyl chains, phosphonates monolayers or amine monolayers, or other adhesion promoters.

In alternative embodiments, the top coat can be a polymeric material comprising reactive functionalities compatible with a adhesion promoter and/or other additional promoter in an adhesion layer on a coated substrate. For example, it may be desirable to prepare a coated substrate having a polymer coating, such as on a metal or polymer substrate for use in, for example, the automotive field as a car window having a multiple layer stack adhesive, where and the adhesion promoter of the present disclosure can be functionalized to be miscible with the glass and the other adhesives in the stack, such as acrylates, urethanes, epoxies, and the like. In such an exemplary embodiment, the polymer coating can be a urethane polymer, such as any urethane polymer known in the art for use in connection with the automotive field. In the current disclosure, the use of a adhesion promoter as described herein comprising —NCO functionalities or amine functional groups, with or without an additional adhesion promoter as described herein, can provide a coated substrate having improved properties, such as improved durability.

Exemplary top coats for use in connection with polymer-based top coats or adhesives in connection with adhesion promoters as described herein include, but are not limited to, urethanes, epoxies, acrylates, polvinylidene fluoride (PVDF), polytetrafluoroethylene (PTFE), polyester, polyethylene (PE), polyvinyl acrylic (PVC), polyetheretherketone (PEEK) polypropylene (PP), polystyrene, polyamide (PA), polyethylene terephthalate (PET), polyfluorene vinylene (PFV), acrylonitrile butadiene styrene (ABS), polyphenylene sulfide (PPS), polysulfone (PSU), polyoxymethyele plastic (POM), polyetherketone (PEK), and nylon.

Surfaces and Applications

There is no particular restriction as to the substrate to which the present invention may be applied. For example, substrates include metal, plastic, glass, ceramic or other inorganic materials, organic materials, or a combination thereof, such as composite materials, laminated materials, and the like. Further, the surface of the substrate may be the substrate surface itself, or may be the surface of a material different from the substrate surface, such as the coating surface of a coated metal plate, or the surface of a surface-treated layer of surface-treated glass. With respect to the shape of the substrate, it may not necessarily be a flat plate, and it may have an optional shape depending upon the particular purpose, such as the one having a curvature over the entire surface or at a part thereof, such as in a mobile phone screen having rounded edges for a full edge-to-edge screen.

For the surface treatment of the substrate, no special pretreatment is required. However, pretreatment may be conducted as the case requires. For example, acid treatment with e.g. diluted hydrofluoric acid or hydrochloric acid, alkali treatment with e.g. an aqueous sodium hydroxide solution, or discharge treatment by e.g. plasma irradiation, may be conducted. In some embodiments, the disclosure provides a process for preparing a coated substrate comprising obtaining hydrolysable group-tethered adhesion promoter (PAP) coating on a substrate, comprising a. activating a surface of a substrate by contacting the surface with a plasma of a gas selected from the group consisting of Ar, He, $N_2$, $O_2$, or $H_2O$ or a plasma of a mixture thereof; b. coating a surface of a substrate with an adhesion promoter comprising at least one adhesion promoter, and optionally one or more additional adhesion promoters to provide an adhesive layer; and c. contacting the adhesive layer on the substrate with a top coat.

In the present invention, a particularly suitable substrate is a substrate made of a transparent material such as glass or plastic, and a suitable article having such a substrate mounted to utilize the transparency. Thus, the substrate of the present invention is particularly suitable for articles for transportation equipment and articles for buildings or building decorations.

Articles for transportation include, but are not limited to, exterior parts such as outer plates, window glass, mirrors and display panels, and interior parts such as instrument panels of cars, buses, trucks, automobiles, ships or aircraft. Such an article may be composed solely of the surface-treated substrate or may have the surface-treated substrate incorporated therein. For example, the former may be a window glass for an automobile, such as a windshield, and the latter may be a side mirror for an automobile in which a glass mirror is incorporated into a housing unit mounted on the exterior of the automobile.

The articles for use in transportation include vehicle bodies, window glass, such as windshield, side windows, rear window, and sunroof, mirrors, and the like for use in automobiles, buses or trucks, ships, and aircraft.

Further, articles for buildings or building decorations may be articles to be attached to buildings or articles already attached to buildings, or articles for buildings which are not attached to buildings but which are used in buildings, articles for buildings include, but are not limited to, furniture or equipment, and base materials, such as glass plates.

Specifically, they include window glass plates, window glass, glass plates for roofs, glass plates for doors or doors having such glass plates installed, glass plates for partitions, glass plates for green houses, or green houses having such glass plates, transparent plastic plates to be used instead of glass, the above-mentioned various articles for buildings (window materials and roof materials) having such plastic plates incorporated, wall materials made of ceramics, cement, metals or other materials, mirrors, furniture and display shelves having such walls or mirrors, and glass for showcases.

Such an article may be made of the coated substrate alone or may be the one having the coated substrate incorporated therein. For example, the former may be a window glass plate, and the latter may be furniture in which a glass mirror is incorporated.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

EXAMPLES

The following examples are set forth for purposes of illustration only. Parts and percentages appearing in such examples are by weight unless otherwise stipulated.

Example 1

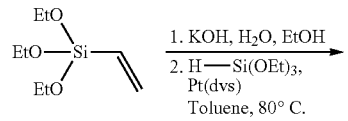

Triethoxyvinylsilane (11 g, 0.058 mol) was dissolved in 30 mL of EtOH at room temperature followed by the addition of 2.0 ml of aqueous KOH solution (10 mg/ml). The reaction mixture was stirred for overnight at RT. The next day a white precipitate was filtered off and dried in-vacuo to provide 2.3 g of white solid. (51%). Obtained white solid/or commercially available octavinyl-T8-silsesquioxane (5.0 g, 7.9 mmol, 1 eq) and triethoxysilane (10.4 g, 0.063 mol, 8 eq) were dissolved in anhydrous toluene (40 ml) and purged under Argon for 30 minutes. Then, catalytic amount of Pt(dvs) (25 μL) was added to the reaction mixture and heated up to 80° C. for overnight. The solution was filtered through silica to remove excess starting material. The organic filtrate is dried in-vacuo. Obtained pale yellow oil. Yield: 11.8 g (79%).

$^1$H NMR (CDCl$_3$, 500 MHz): δ 0.63-0.66 (t, 32H), 1.20-1.23 (t, 72H), 3.78-3.81 (d, 48H), $^{13}$C NMR (CDCl$_3$, 120 MHz): 1.61 (8C), 3.35 (8C), 18.27 (24C), 58.32 (24C).

Example 2

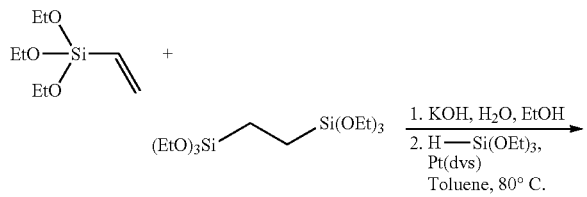

7.50 g of vinyl triethoxysilane (39.5 mmol, 14 eq) and 1.0 g of 1,2-bis(triethoxysilyl)ethane (2.82 mmol, 1 eq) with a catalytic amount of aqueous KOH solution were dissolved in ethanol at room temperature, and stirred for five hours. During the reaction, a white precipitate formed in the reaction vessel. The solid portion was filtered off, and dried in-vacuo. Obtained 2.60 g of white powder (2.10 mmol, Yield 74%).

1.0 g of the white powder (0.95 mmol, 1 eq) and 2.35 g of triethoxysilane (14.3 mmol, 15 eq) were dissolved in toluene at 40° C. for 30 minutes under Ar gas purging. A catalytic amount of Pt(0) was added to the reaction mixture, and heated to 80° C. for 8 hours. The solution was filtered through silica to remove by-product. The organic filtrate was dried in-vacuo to provide 0.34 g of pale yellow oil (0.09 mmol, Yield 10%).

$^1$H NMR (CDCl$_3$, 500 MHz): δ 0.12 (t, 4H), 0.63-0.66 (t, 56H), 1.20-1.23 (t, 126H), 3.78-3.81 (d, 84H), $^{13}$C NMR (CDCl$_3$, 120 MHz): 1.37 (14C), 2.1 (2C), 2.52 (14C), 18.27 (42C), 58.32 (42C).

Example 3

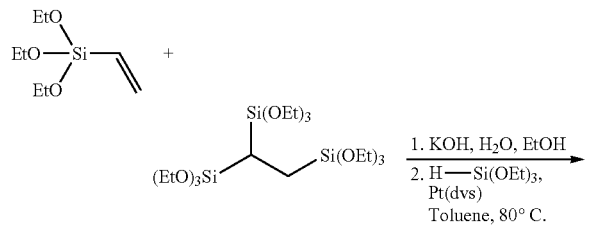

27.2 g of vinyl triethoxysilane (143.0 mmol, 21 eq) and 3.51 g of 1,1,2-tris(triethoxysilyl)ethane (6.79 mmol, 1 eq) with catalytic amount of aqueous KOH solution were dissolved in ethanol at room temperature, and stirred for five hours. During the reaction, a white precipitate formed in the reaction vessel. The solid portion was filtered off, and dried in-vacuo to provide 12 g of white solid (6.50 mmol, Yield 96%)

7.56 g of white solid prepared by the method described in the preceding paragraph (5.18 mmol, 1 eq) and 17.88 g of triethoxysilane (108.82 mmol, 21 eq) were dissolved in toluene at 40° C. for 30 minutes under Ar gas purging. A catalytic amount, 0.2 mL, of Pt(0) was added to the reaction mixture, and heated up to 80° C. for 8 hours. The solution was filtered through silica to remove by-product. The organic filtrate was dried in-vacuo to provide 18.85 g of pale yellow oil (3.56 mmol, Yield 69%).

$^1$H NMR (CDCl$_3$, 500 MHz): δ -0.98 (1H), 0.11 (2H), 0.56-0.69 (t, 84H), 1.10-1.13 (t, 189H), 3.72-3.74 (d, 126H), $^{13}$C NMR (CDCl$_3$, 120 MHz): -2.17 (1C), 1.35 (1C), 1.38 (21C), 2.52 (21C), 17.88 (63C), 58.07 (63C).

Example 4

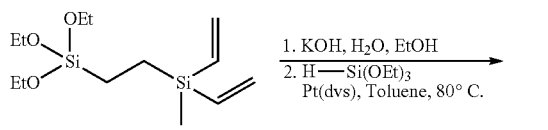

5.0 g of 2-(divinylmethyl silyl)ethyltriethoxysilane (17.32 mmol, 1 eq) with a catalytic amount of aqueous KOH solution were dissolved in ethanol at room temperature, and stirred for five hours. During the reaction, the solution became turbid. The product was dried in-vacuo to provide 3.2 g of liquid (2.29 mmol, Yield 64%)

1.58 g of the liquid from the first step (1.11 mmol, 1 eq) and 3.10 g of triethoxysilane (18.88 mmol, 16 eq) were dissolved in toluene at 40° C. for 30 minutes under Ar gas purging. A catalytic amount of Pt(0) was added to the reaction mixture, and heated up to 80° C. for 8 hours. The solution was filtered through silica to remove by-product. The organic filtrate was dried in-vacuo to provide 2.3 g of pale yellow oil (0.57 mmol, Yield 51%).

Example 5

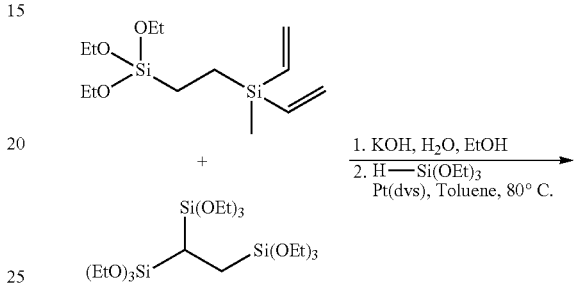

2-(divinylmethylsilyl)ethyltriethoxysilane and 1,1,2-tris(triethoxysilyl)ethane with catalytic amount of aqueous KOH solution were dissolved in ethanol at room temperature, and stirred for five hours. During the reaction, a white precipitate formed in the reaction vessel. The solid portion was filtered off and dried in-vacuo.

2.41 g of the solid obtained in the first step (0.58 mmol, 1 eq) and 4.17 g of triethoxysilane (25.38 mmol, 45 eq) were dissolved in toluene at 40° C. for 30 minutes under Ar gas purging. A catalytic amount of Pt(0) was added to the reaction mixture and heated up to 80° C. for 8 hours. The solution was filtered through silica to remove by-product. The organic filtrate was dried in-vacuo. Obtained 1.89 g of pale yellow oil (0.17 mmol, Yield 30%).

Example 6

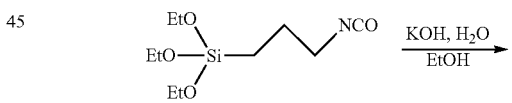

5 g of 3-isocyanatopropyl triethoxysilane (20.21 mmol, 1 eq) with catalytic amount of aqueous KOH solution were dissolved in ethanol at room temperature and stirred for five hours. Added ethyl acetate to the reaction mixture and washed out with distilled water couple of times. Organic filtrate was dried over MgSO$_4$ and evaporated the solvent in-vacuo. Obtained 3.0 g of pale yellow oil (2.75 mmol, yield 95%).

Example 7

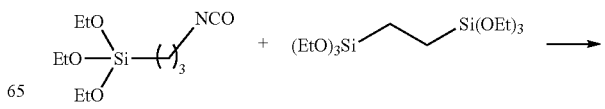

4.48 g of 3-isocyanatopropyl triethoxysilane (18.11 mmol, 14 eq) and 0.45 g of 1, 2-bis(triethoxysilyl)ethane (1.26 mmol, 1 eq) with catalytic amount of aqueous KOH solution were dissolved in ethanol at room temperature, and stirred for five hours. Added ethyl acetate to the reaction mixture, and washed out with distilled water couple of times. The organic filtrate was dried over MgSO$_4$ and evaporated the solvent in-vacuo to provide 2.32 g of pale yellow oil (1.26 mmol, yield quantitative).

Example 9

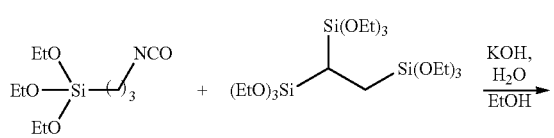

2.51 g of 3-isocyanatopropyl triethoxysilane (20.31 mmol, 21 eq) and 0.25 g of 1,1,2-tris(triethoxysilyl)ethane (0.97 mmol, 1 eq) with catalytic amount of aqueous KOH solution were dissolved in ethanol at room temperature and stirred for five hours. Added ethyl acetate to the reaction mixture and washed out with distilled water couple of times. The organic filtrate was dried over MgSO$_4$, and evaporated the solvent in-vacuo to provide 2.2 g of pale yellow oil (0.83 mmol, yield 86%)

Example 10

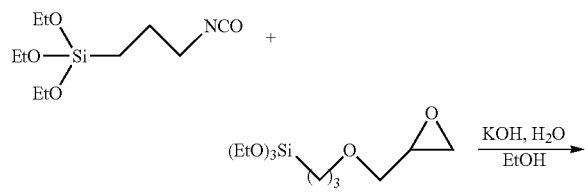

5.0 g of 3-Isocyanatopropyl triethoxysilane (21.21 mmol, 6 eq) and 1.59 g of 3-glycidoxypropyl triethoxysilane (6.73 mmol, 2 eq) with catalytic amount of aqueous KOH solution are dissolved in ethanol at room temperature and stirred for five hours. Added ethyl acetate to the reaction mixture and washed out with distilled water couple of times. Organic filtrate was dried over MgSO$_4$ and evaporated the solvent in-vacuo. Obtained 4.10 g of white solid (3.56 mmol, yield 99%).

Example 11

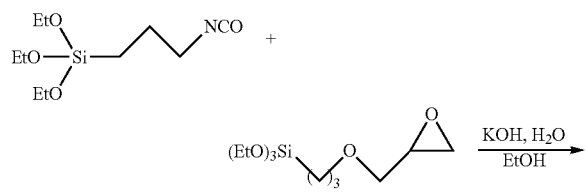

4.0 g of 3-isocyanatopropyl triethoxysilane (16.17 mmol, 4 eq) and 3.82 g of 3-glycidoxypropyl triethoxysilane (16.17 mmol, 4 eq) with catalytic amount of aqueous KOH solution were dissolved in ethanol at room temperature, and stirred for five hours. Added ethyl acetate to the reaction mixture and washed out with distilled water couple of times. The organic filtrate was dried over MgSO$_4$, and evaporated the solvent in-vacuo to provide 4.95 g of white solid (4.0 mmol, yield 99%).

Example 12

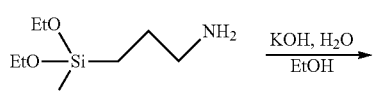

20.32 g of 3-propylamine triethoxysilane (91.99 mmol, 1 eq) with catalytic amount of aqueous KOH solution were dissolved in ethanol at room temperature and stirred for five hours. Added ethyl acetate to the reaction mixture and washed out with distilled water couple of times. Organic filtrate was dried over MgSO$_4$ and evaporated the solvent in-vacuo. Obtained 9.71 g of pale yellow oil (11.01 mmol, yield 96%).

$^1$H NMR ((EtOH-D, 500 MHz): δ 0.56-0.61 (t, 16H), 1.25-1.34 (m, 16H), 2.65-2.87 (t, 16H), 3.16-3.19 (b, 16H), $^{13}$C NMR ((EtOH-D, 500 MHz): δ 1.93 (8C), 24.8 (8C), 64.5 (8C)

Example 13

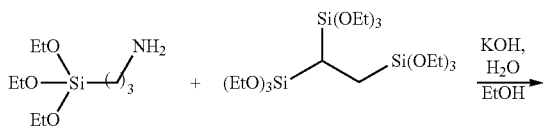

5.00 g of 3-propylamine triethoxysilane (22.58 mmol, 1 eq) and 0.55 g of 1,1,2-tris(triethoxysilyl)ethane (1.07 mmol, 1 eq) with catalytic amount of aqueous KOH solution were dissolved in ethanol at room temperature and stirred for five hours. Added ethyl acetate to the reaction mixture and washed out with distilled water couple of times. Organic filtrate was dried over MgSO$_4$ and evaporated the solvent in-vacuo. Obtained 2.34 g of pale yellow oil (1.01 mmol, yield 95%).

$^1$H NMR ((EtOH-D, 500 MHz): δ 0.58-0.65 (t, 16H), 1.28-1.37 (m, 16H), 2.64-2.87 (t, 16H), $^{13}$C NMR ((EtOH-D, 120 MHz): δ 1.93 (8C), 2.1 (1C), 25.8 (8C), 64.5 (8C),

Example 14

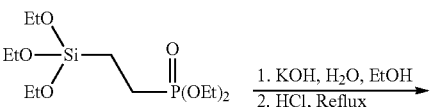

Phosphonatoethyltriethoxysilane (5.12 g, 15.59 mmol) was dissolved in 10 mL of EtOH at room temperature followed by the addition of 2.0 ml of aqueous KOH solution (10 mg/ml). The reaction mixture was stirred for overnight at RT. The next day, the solution was extracted with ethyl-acetate. Organic layer was dried over Na$_2$SO$_4$ and dried in-vacuo to provide 2.39 g of liquid (1.54 mmol, Yield 79%). Obtained liquid were dissolved in a mixture of 10 ml of ethanol and water. Then, 3 ml of HCl was added to the reaction mixture and refluxed for overnight. The solution was filtered through silica to remove excess starting material. The organic filtrate is dried in-vacuo. Obtained liquid. Yield: 1.09 g (8.47 mmol, 55%).

$^1$H NMR (Acetone-D, 500 MHz): δ 0.75-0.80 (t, 16H), 1.21-1.29 (t, 48H), 1.62-1.69 (t, 16H), 3.99-4.08 (q, 32H), $^{13}$C NMR (Acetone-D, 120 MHz): 15.97 (8C), 28.81 (8C).

Example 15

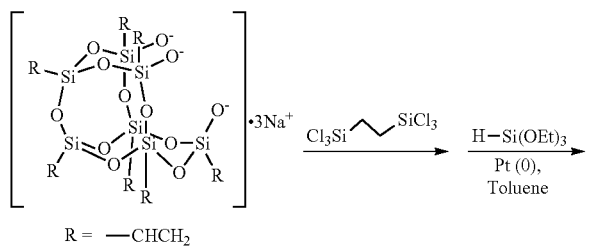

Vinyltriethoxysilane (10 g, 52.5 mmol), THF (50 ml), distilled water (1 g), and sodium hydroxide (0.79 g, 19.8 mmol) are charged into a four-necked flask equipped with a reflux condenser and a thermometer at 70° C. for 5 h with magnetically stirring. The system is allowed to get cool to room temperature and left for 15 h. The volatile components are removed by heating at 95° C. under atmospheric pressure to obtain a white precipitate, which is collected by a membrane filter having a pore diameter of 0.5 μm, washed with THF, and dried at 80° C. for 3 h in a vacuum oven to yield hepta(vinyl)-tricycloheptasiloxane trisodium silanolate. See also *Macromolecules*, 38 (2008) 1264-1270 for synthesis of tricycloheptsiloxane trisodium silanoate.

Hepta(vinyl)-tricycloheptasiloxane trisodium silanolate (2.2 g, 3.40 mmol), triethylamine (0.35 g, 3.45 mmol) and dry THF (50 ml) are charged into a round-bottomed flask, to which 1,2-bis(trichlorosilyl)ethane (0.50 g, 1.1 mmol) is quickly added at room temperature. The mixture is magnetically stirred for 4 h at room temperature. The resultant precipitate is removed by filtration, and the filtrate is concentrated by a rotary evaporator to obtain a crude product. The resultant solid is dispersed in methanol, collected with a membrane filter, and dried at 75° C. for 5 h to yield 1,2-bis(heptavinyladhesion promoters)ethane.

1,2-bis(heptavinyladhesion promoters) (2 g, 1.61 mmol) and triethoxysilane (3.7 g, 22.58 mol) in toluene (50 ml) are charged into a round-bottomed flask. The reaction mixture is stirred at 40° C. for 30 minutes under Ar(g) purging. Then, the catalytic amount of Pt (0) is added to the reaction mixture and heated up to 80° C. for 8 hours. The solution is filtered through Celite to remove unreacted reactant. The organic filtrate is dried in-vacuo to yield 1,2-bis(hepta (triethoxysilyl)adhesion promoters)ethane.

Example 16

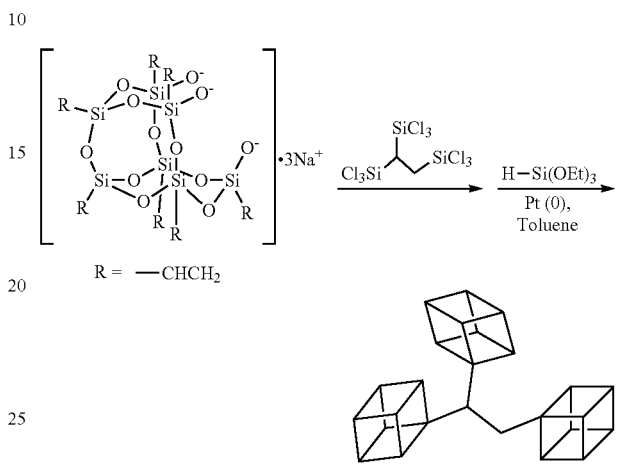

Vinyltriethoxysilane (10 g, 52.5 mmol), THF (50 ml), distilled water (1 g), and sodium hydroxide (0.79 g, 19.8 mmol) are charged into a four-necked flask equipped with a reflux condenser and a thermometer at 70° C. for 5 h with magnetically stirring. The system is allowed to get cool to room temperature and left for 15 h. The volatile components are removed by heating at 95° C. under atmospheric pressure to obtain a white precipitate, which is collected by a membrane filter having a pore diameter of 0.5 μm, washed with THF, and dried at 80° C. for 3 h in a vacuum oven to yield hepta(vinyl)-tricycloheptasiloxane trisodium silanolate.

Hepta(vinyl)-tricycloheptasiloxane trisodium silanolate (2.2 g, 3.40 mmol), triethylamine (0.35 g, 3.45 mmol) and dry THF (50 ml) are charged into a round-bottomed flask, to which 1,1,2-tris(trichlorosilyl)ethane (0.47 g, 1.1 mmol) is quickly added at room temperature. The mixture is magnetically stirred for 4 h at room temperature. The resultant precipitate is removed by filtration, and the filtrate is concentrated by a rotary evaporator to obtain a crude product. The resultant solid is dispersed in methanol, collected with a membrane filter, and dried at 75° C. for 5 h to yield 1,1,2-tris(heptavinyladhesion promoters)ethane.

1,1,2-tris(heptavinyladhesion promoters) (1 g, 1.54 mmol) and triethoxysilane (5.33 g, 32.46 mol) in toluene (50 ml) are charged into a round-bottomed flask. The reaction mixture is stirred at 40° C. for 30 minutes under Ar(g) purging. Then, the catalytic amount of Pt (0) is added to the reaction mixture and heated up to 80° C. for 8 hours. The solution is filtered through Celite to remove unreacted reactant. The organic filtrate is dried in-vacuo to yield 1,1,2-tris(hepta(triethoxysilyl)adhesion promoters)ethane.

Example 17

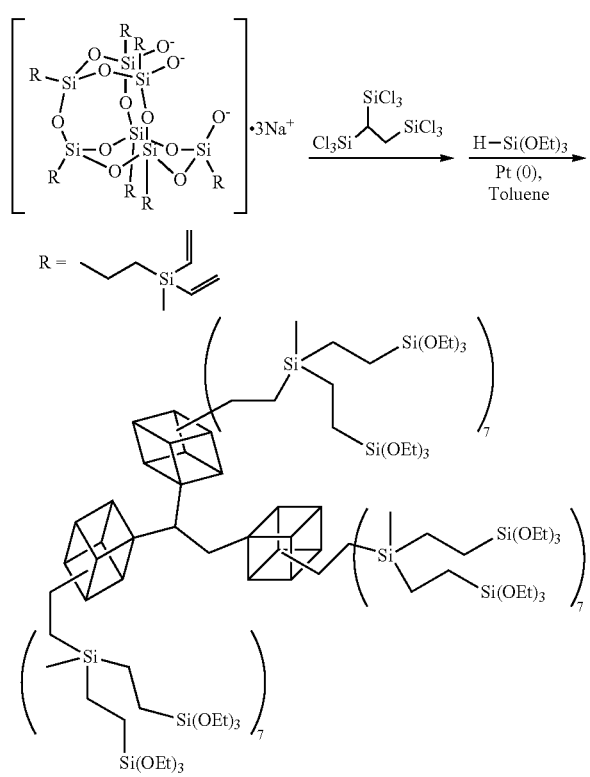

2-(divinylmethylsilyl)ethyltriethoxysilane (10 g, 34.65 mmol), THF (50 ml), distilled water (1 g), and sodium hydroxide (0.79 g, 19.8 mmol) are charged into a four-necked flask equipped with a reflux condenser and a thermometer at 70° C. for 5 h with magnetically stirring. The system is allowed to get cool to room temperature and left for 15 h. The volatile components are removed by heating at 95° C. under atmospheric pressure to obtain a white precipitate, which is collected by a membrane filter having a pore diameter of 0.5 μm, washed with THF, and dried at 80° C. for 3 h in a vacuum oven to yield hepta(2-(divinylmethylsilyl)ethyl)-tricycloheptasiloxane trisodium silanolate.

Hepta(2-(divinylmethylsilyl)ethyl)-tricycloheptasiloxane trisodium silanolate (5 g, 3.74 mmol), triethylamine (0.38 g, 3.75 mmol) and dry THF (60 ml) are charged into a round-bottomed flask, to which 1,1,2-tris(trichlorosilyl)ethane (0.51 g, 1.18 mmol) is quickly added at room temperature. The mixture is magnetically stirred for 4 h at room temperature. The resultant precipitate is removed by filtration, and the filtrate is concentrated by a rotary evaporator to obtain a crude product. The resultant solid is dispersed in methanol, collected with a membrane filter, and dried at 75° C. for 5 h to yield 1,1,2-tris(hepta((divinylmethylsilyl)ethyl) adhesion promoters)ethane as a white solid.

1,1,2-tris(hepta((divinylmethylsilyl)ethyl)adhesion promoters)ethane (1 g, 0.75 mmol) and triethoxysilane (5.17 g, 31.5 mol) in toluene (50 ml) are charged into a round-bottomed flask. The reaction mixture is stirred at 40° C. for 30 minutes under Ar(g) purging. Then, the catalytic amount of Pt (0) is added to the reaction mixture and heated up to 80° C. for 8 hours. The solution is filtered through Celite to remove unreacted reactant. The organic filtrate is dried in-vacuo to yield 1,1,2-tris(hepta((di(triethoxysilyl)methylsilyl)ethyl)adhesion promoters)ethane.

Example 18

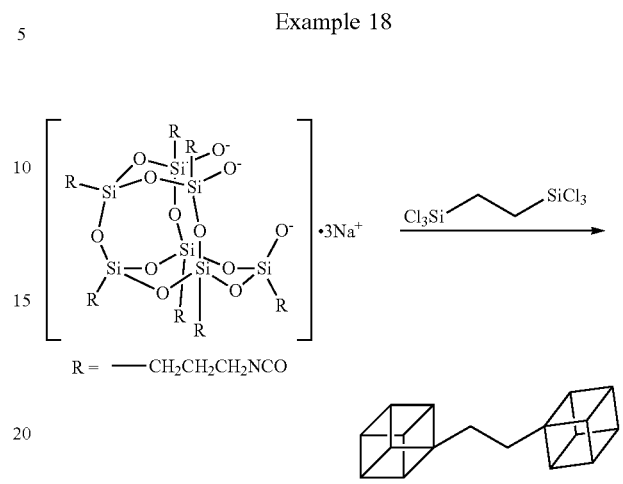

3-Isocyanatoppropyltriethoxysilane (10 g, 40.42 mmol), THF (50 ml), distilled water (1 g), and sodium hydroxide (0.8 g, 20 mmol) are charged into a four-necked flask equipped with a reflux condenser and a thermometer at 70° C. for 5 h with magnetically stirring. The system is allowed to get cool to room temperature and left for 15 h. The volatile components are removed by heating at 95° C. under atmospheric pressure to obtain a white precipitate, which is collected by a membrane filter having a pore diameter of 0.5 μm, washed with THF, and dried at 80° C. for 3 h in a vacuum oven to yield hepta(3-isocayanatopropyl)-tricycloheptasiloxane trisodium silanolate.

Hepta(3-isocyanatopropyl)-tricycloheptasiloxane trisodium silanolate (3 g, 2.87 mmol), triethylamine (0.29 g, 2.87 mmol) and dry THF (50 ml) are charged into a round-bottomed flask, to which 1,2-bis(trichlorosilyl)ethane (0.42 g, 1.43 mmol) is quickly added at room temperature. The mixture is magnetically stirred for 4 h at room temperature. The resultant precipitate is removed by filtration, and the filtrate is concentrated by a rotary evaporator to obtain a crude product. The resultant solid is dispersed in methanol, collected with a membrane filter, and dried at 75° C. for 5 h to yield 1,2-bis(hepta(isocyanatopropyl)adhesion promoters).

Example 19

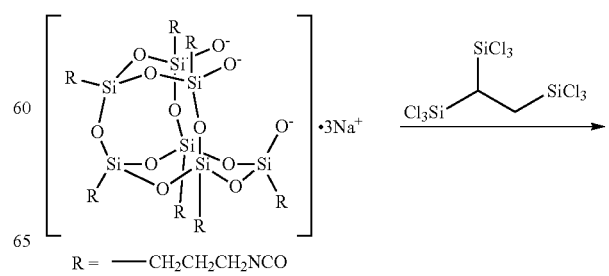

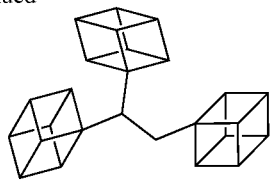

3-Isocyanatoppropyltriethoxysilane (10 g, 40.42 mmol), THF (50 ml), di stilled water (1 g), and sodium hydroxide (0.8 g, 20 mmol) are charged into a four-necked flask equipped with a reflux condenser and a thermometer at 70° C. for 5 h with magnetically stirring. The system is allowed to get cool to room temperature and left for 15 h. The volatile components are removed by heating at 95° C. under atmospheric pressure to obtain a white precipitate, which is collected by a membrane filter having a pore diameter of 0.5 µm, washed with THF, and dried at 80° C. for 3 h in a vacuum oven to yield hepta(3-isocayanatopropyl)-tricycloheptasiloxane trisodium silanolate.

Hepta(2-(divinylmethylsilyl)ethyl)-tricycloheptasiloxane trisodium silanolate (3 g, 2.87 mmol), triethylamine (0.29 g, 2.87 mmol) and dry THF (50 ml) are charged into a round-bottomed flask, to which 1,1,2-tris(trichlorosilyl)ethane (0.41 g, 0.95 mmol) is quickly added at room temperature. The mixture is magnetically stirred for 4 h at room temperature. The resultant precipitate is removed by filtration, and the filtrate is concentrated by a rotary evaporator to obtain a crude product. The resultant solid is dispersed in methanol, collected with a membrane filter, and dried at 75° C. for 5 h to yield 1,1,2-tris(hepta(isocyanatopropyl)adhesion promoters)ethane.

Example 20

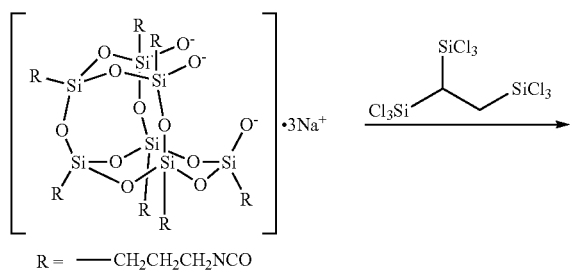

3-Propylaminotriethoxysilane (10 g, 45.17 mmol), THF (50 ml), distilled water (1 g), and sodium hydroxide (0.8 g, 20 mmol) are charged into a four-necked flask equipped with a reflux condenser and a thermometer at 70° C. for 5 h with magnetically stirring. The system is allowed to get cool to room temperature and left for 15 h. The volatile components are removed by heating at 95° C. under atmospheric pressure to obtain a white precipitate, which is collected by a membrane filter having a pore diameter of 0.5 µm, washed with THF, and dried at 80° C. for 3 h in a vacuum oven to yield hepta(3-aminopropyl)-tricycloheptasiloxane trisodium silanolate.

Hepta(3-aminopropyl)-tricycloheptasiloxane trisodium silanolate (3 g, 3.47 mmol), triethylamine (0.35 g, 3.47 mmol) and dry THF (50 ml) are charged into a round-bottomed flask, to which 1,1,2-tris(trichlorosilyl)ethane (0.47 g, 1.1 mmol) is quickly added at room temperature. The mixture is magnetically stirred for 4 h at room temperature. The resultant precipitate is removed by filtration, and the filtrate is concentrated by a rotary evaporator to obtain a crude product. The resultant solid is dispersed in methanol, collected with a membrane filter, and dried at 75° C. for 5 h to yield 1,1,2-tris(hepta(aminopropyl)adhesion promoters)ethane.

Example 21—Activating Plasma Conditions

To do this, the substrate provided with its primer layer was placed in a chamber of a low-pressure PECVD (plasma-enhanced chemical vapor deposition) reactor. A residual vacuum in the chamber of at least 5 mPa ($5 \cdot 10^{-5}$ mbar) was firstly created prior to the activating gas being introduced. The gas or gas mixture was introduced for the surface treatment of glass substrate into the chamber with flow rates at 100 sccm until the total pressure in the reactor was set at 350 mTorr.

At equilibrium, a plasma of the gas introduced was ignited by electrically biassing the gas diffuser with an average radiofrequency (13.56 MHz) power of 100 W for a time ranging from 1 minute at room temperature.

Example 22—Adhesion Promoter Application

Prepared an ethanolic solution of 20 ml of Ethanol and 0.08 g of trisPAP and thoroughly stirred for 30 min. Added 0.15 mL of nitric acid to the ethanolic solution. Plasma surface-treated glass (4"×4") was dipped into the solution for two minutes and dried at room temperature. Prepared top coating solution of 20 ml of ethanol and g of F-@FOPOSS and g of fluoroalkyl silane with 150 uL of nitric acid. Dried glass surface was dipped in a hydrophobic coating solution for 30 minutes. The coated glass surface was dried in the oven at 75° C. for at least 2 hours.

Example 23—Testing and Analysis

Example 24—Contact Angle Measurement

The wettability of two different hydrophobic samples (with and without tris-PAP) was estimated by contact angle measurement with different fluids such as water and hexadecane. The results obtained for the specimens prepared in accordance with the procedure above are shown in Table 1 and 2 for a hydrophobic coating without tris-PAP and a hydrophobic coating with tris-PAP below.

TABLE 1

|  | 1 | 2 | 3 | 4 | 5 | Mean |
|---|---|---|---|---|---|---|
| Water | 107 | 114 | 112 | 116 | 114 | 113 |
| hexadecane | 76 | 77 | 78 |  |  | 77 |

Table 2 below shows contact angle measurements with different fluids such as water and hexadecane.

TABLE 2

| | 1 | 2 | 3 | 4 | 5 | Mean |
|---|---|---|---|---|---|---|
| Water | 114 | 117 | 116 | 116 | 117 | 116 |
| hexadecane | 80 | 82 | 77 | | | 80 |

Example 25—Abrasion Resistance

The abrasion resistance of the omniphobic substrates obtained was measured according to ASTM D4060. The test was carried out on the specimens with an abrasive disk of CS-10 hardness under a load of 250 g on an area measuring 1.5 cm$^2$, with a translational rate of 50 cycles/minute and a rotation speed of 6 rpm. A specimen was deemed to be satisfactory in the test if the contact angle remained greater than 70 degrees after 1500 cycles. It may be seen that the abrasion resistance properties of the specimen were sufficient and there was no marginal degradation of water contact angle, as shown in FIG. 6, which is a chart showing the results of a mechanical abrasion (ASTM D4060 Taber) test: 500 g weight load for 1,500 cycles (CS-10 wheel).

A 500 g weight was loaded to the abrasive disk of CS-10 hardness. As shown in Table 4, without tris-PAP treatment, the hydrophobic coated specimen showed substantial degradation. Over 1,500 cycles, water contact angle decreased the cutoff limit for water and diiodomethane (70 degrees and 30 degrees).

Table 3 shows water contact angle measurements of a hydrophobic coating without tris-PAP under mechanical abrasion (ASTM D4060)

TABLE 3

| Cycle | 1 | 2 | 3 | 4 | 5 | Mean |
|---|---|---|---|---|---|---|
| 0 | 107 | 114 | 112 | 116 | 114 | 113 |
| 500 | 74 | 75 | 75 | 77 | 76 | 75 |
| 1000 | 58 | 56 | 90 | 63 | 60 | 65 |
| 1500 | 50 | 55 | 60 | 57 | 57 | 56 |

On the contrary, the tris-PAP treated hydrophobic coated specimen showed marginal decrease in water contact angle. Over 1500 cycles, water contact angle stayed above the cutoff limit for water and diiodomethane (70 degrees and 30 degrees). Compared to tris-PAP untreated specimen, tris-PAP treated specimen showed 73% enhanced anti-wetting property at 1,500 cycles.

Table 4 shows water contact angle measurements of a hydrophobic coating with tris-PAP under mechanical abrasion (ASTM D4060)

TABLE 4

| Cycle | 1 | 2 | 3 | 4 | 5 | Mean |
|---|---|---|---|---|---|---|
| 0 | 117 | 114 | 116 | 116 | 117 | 116 |
| 500 | 109 | 110 | 111 | 110 | 109 | 110 |
| 1000 | 103 | 103 | 103 | 103 | 102 | 103 |
| 1500 | 96 | 98 | 97 | 98 | 97 | 97 |

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. A coated substrate comprising:
   a) a substrate;
   b) a coating composition on the substrate, the coating composition comprising one or more organosilane polymers that have a linear or branched chain structure; and
   c) a topcoat composition on the coating composition,
   wherein the one or more organosilane polymers comprise units of Formula (I) and Formula (I'):

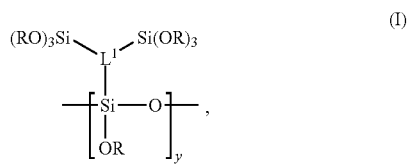

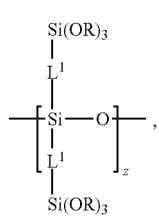

(I')

wherein in Formula (I) and Formula (I'): each R is the same or different and is a hydrogen or non-hydrogen substituent; each $L^1$ is the same or different and is a substituted or unsubstituted $C_1$-$C_{20}$ alkylene, or substituted or unsubstituted $C_2$-$C_{20}$ heteroalkylene; and y and z are the same or different and each is a positive integer, wherein the one or more organosilane polymers have a weight average molecular weight of about 1000 g/mol or greater.

2. The coated substrate of claim 1 wherein the one or more organosilane polymers have a weight average molecular weight of about 4000 g/mol or greater.

3. The coated substrate of claim 1 wherein the one or more organosilane polymers comprise units of Formula (IA):

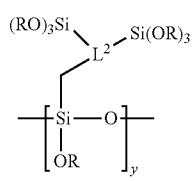

(IA)

wherein in Formula (IA): each R is the same or different and is a hydrogen or non-hydrogen substituent; $L^2$ is a substituted or unsubstituted $C_1$-$C_{20}$ alkylene, or substituted or unsubstituted $C_2$-$C_{20}$ heteroalkylene; and y is a positive integer.

4. The coated substrate of claim 1 wherein the one or more organosilane polymers comprise units of Formula (IB):

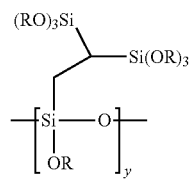

(IB)

wherein in Formula (IB): each R is the same or different and is a hydrogen or non-hydrogen substituent; and y is a positive integer.

5. The coated substrate of claim 1 wherein the one or more organosilane polymers comprise units of Formula (II):

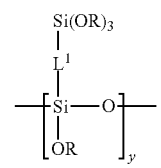

(II)

wherein in Formula (II): each R is the same or different and is a hydrogen or non-hydrogen substituent; $L^1$ is a substituted or unsubstituted $C_1$-$C_{20}$ alkylene, or substituted or unsubstituted $C_2$-$C_{20}$ heteroalkylene; and y is a positive integer.

6. The coated substrate of claim 1 wherein the one or more organosilane polymers comprise units of Formula (IIA):

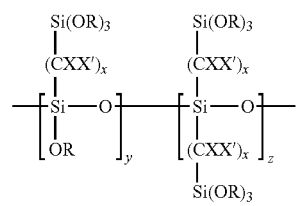

(IIA)

wherein in Formula (IIA): each R is the same or different and is a hydrogen or non-hydrogen substituent; each X and X' is the same or different and is hydrogen or a non-hydrogen substituent; each x is the same or different positive integer from 1 to 20; and y and z are each the same or different positive integer.

7. The coated substrate of claim 1 wherein the one or more organosilane polymers comprise units of Formula (IIB):

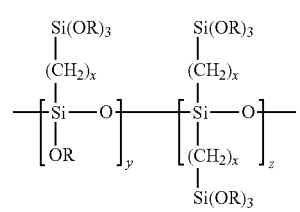

(IIB)

wherein in Formula (IIB): each R is the same or different and is a hydrogen or non-hydrogen substituent; each x is the same or different positive integer from 1 to 20; and y and z are each the same or different positive integer.

8. The coated substrate of claim 1, wherein each R is other than hydrogen.

9. The coated substrate of claim 1 wherein the top coat composition comprises a reactive component comprising a hydroxyl acrylate compound.

* * * * *